(12) United States Patent
Zhang et al.

(10) Patent No.: US 11,770,891 B2
(45) Date of Patent: *Sep. 26, 2023

(54) COST EFFECTIVE CARTRIDGE FOR A PLASMA ARC TORCH

(71) Applicant: Hypertherm, Inc., Hanover, NH (US)

(72) Inventors: Yu Zhang, Hanover, NH (US); Zheng Duan, Hanover, NH (US); Mahyar Esmaili, Hanover, NH (US); Mike Kornprobst, Hanover, NH (US); Brett Hansen, Hanover, NH (US); Garrett Quillia, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 724 days.

This patent is subject to a terminal disclaimer.

(21) Appl. No.: 16/403,846

(22) Filed: May 6, 2019

(65) Prior Publication Data

US 2019/0261501 A1 Aug. 22, 2019

Related U.S. Application Data

(63) Continuation of application No. 14/824,946, filed on Aug. 12, 2015, now Pat. No. 10,582,605.
(Continued)

(51) Int. Cl.
*H05H 1/34* (2006.01)
*B23K 10/02* (2006.01)

(52) U.S. Cl.
CPC ............... *H05H 1/34* (2013.01); *B23K 10/02* (2013.01); *H05H 1/3457* (2021.05); *H05H 1/3468* (2021.05); *H05H 1/3489* (2021.05)

(58) Field of Classification Search
CPC ............. B23K 26/3576; B23K 26/082; B23K 26/1224; B23K 10/02; H01J 37/16;
(Continued)

(56) References Cited

U.S. PATENT DOCUMENTS 2,985,050 A 5/1961 Schwacha
3,018,360 A 1/1962 Engel
(Continued)

FOREIGN PATENT DOCUMENTS

DE 202013010576 U1 2/2014
EP 591018 A1 4/1994
(Continued)

OTHER PUBLICATIONS

Amada America Inc.,"Amada WAGS System", Retrieved from the internet at: http://www.amada.de/en/laser/wacs-system.html, printed Oct. 27, 2016, 2 pages.
(Continued)

*Primary Examiner* — Eric S Stapleton
(74) *Attorney, Agent, or Firm* — Cesari and McKenna, LLP

(57) ABSTRACT

A cartridge for an air-cooled plasma arc torch is provided. The cartridge includes a swirl ring having a molded thermoplastic elongated body with a distal end, a proximal end, and a hollow portion configured to receive an electrode. The swirl ring also has a plurality of gas flow openings defined by the distal end of the elongated body and configured to impart a swirling motion to a plasma gas flow for the plasma arc torch. The swirl ring further includes a nozzle retention feature on a surface of the elongated body at the distal end for retaining a nozzle to the elongated body. The cartridge further includes a cap affixed to the proximal end of the elongated body of the swirl ring for substantially closing the proximal end of the elongated body.

39 Claims, 8 Drawing Sheets

Related U.S. Application Data

(60) Provisional application No. 62/036,393, filed on Aug. 12, 2014.

(58) Field of Classification Search
CPC .. H01J 9/245; H01J 37/3244; H01J 37/32183; H01J 2237/166; H01L 21/68785; H01L 21/67109; H01L 21/6831; H01L 21/67069; H01L 21/67103; H05H 1/34; H05H 1/3489; H05H 1/3457; H05H 1/3468
USPC .......................................... 219/121.69, 121.5
See application file for complete search history.

(56) References Cited

U.S. PATENT DOCUMENTS

| | | | |
|---|---|---|---|
| 3,153,133 A | 10/1964 | Ducati | |
| 3,242,305 A | 3/1966 | Kane et al. | |
| 3,279,177 A | 10/1966 | Ducati | |
| 3,294,953 A | 12/1966 | Spies | |
| 3,518,401 A | 6/1970 | Mathews | |
| 3,684,911 A | 8/1972 | Perugini et al. | |
| 3,794,806 A | 2/1974 | Klasson | |
| 4,011,996 A | 3/1977 | Tsuji et al. | |
| 4,034,250 A | 7/1977 | Kiselev et al. | |
| 4,087,050 A | 5/1978 | Tsuji et al. | |
| 4,311,897 A | 1/1982 | Yerushalmy | |
| 4,355,262 A | 10/1982 | Chan et al. | |
| 4,519,835 A | 5/1985 | Gauvin et al. | |
| 4,570,048 A | 2/1986 | Poole | |
| 4,620,080 A | 10/1986 | Arata et al. | |
| 4,682,005 A | 7/1987 | Marhic | |
| 4,687,139 A | 8/1987 | Lockwood | |
| 4,733,052 A | 3/1988 | Nilsson et al. | |
| 4,748,312 A | 5/1988 | Hatch et al. | |
| 4,783,004 A | 11/1988 | Lockwood | |
| 4,896,016 A | 1/1990 | Broberg et al. | |
| 4,914,271 A | 4/1990 | Delzenne et al. | |
| 4,924,060 A | 5/1990 | Delzenne | |
| 4,929,811 A | 5/1990 | Blankenship | |
| 4,940,877 A | 7/1990 | Broberg | |
| 4,948,485 A | 8/1990 | Wallsten et al. | |
| 4,967,055 A | 10/1990 | Raney et al. | |
| 4,982,067 A | 1/1991 | Marantz et al. | |
| 5,018,670 A | 5/1991 | Chalmers | |
| 5,023,425 A | 6/1991 | Severance, Jr. | |
| 5,132,512 A | 7/1992 | Sanders et al. | |
| 5,144,110 A | 9/1992 | Marantz et al. | |
| 5,170,033 A | 12/1992 | Couch, Jr. | |
| 5,183,646 A | 2/1993 | Anderson et al. | |
| 5,200,595 A | 4/1993 | Boulos et al. | |
| 5,208,441 A | 5/1993 | Broberg | |
| 5,239,161 A | 8/1993 | Lang | |
| 5,309,683 A | 5/1994 | Hockett | |
| 5,317,126 A | 5/1994 | Couch, Jr. et al. | |
| 5,390,964 A | 2/1995 | Gray, Jr. | |
| 5,396,043 A | 3/1995 | Couch, Jr. et al. | |
| 5,409,164 A * | 4/1995 | Delzenne ................ | H05H 1/34 239/132.3 |
| 5,440,477 A * | 8/1995 | Rohrberg ................ | F17C 13/04 700/282 |
| 5,502,245 A * | 3/1996 | Dassel .................... | B01J 19/24 568/570 |
| 5,518,221 A * | 5/1996 | Zurecki .................. | C22B 9/006 266/158 |
| 5,556,562 A * | 9/1996 | Sorenson ............... | B23K 9/295 219/137.61 |
| 5,558,842 A * | 9/1996 | Vassiliou ................ | B01J 19/26 261/28 |
| 5,560,844 A * | 10/1996 | Boulos .................... | H05H 1/28 219/121.52 |
| 5,580,531 A * | 12/1996 | Vassiliou ............ | B01F 23/2132 261/28 |
| 5,695,662 A * | 12/1997 | Couch, Jr. .............. | H05H 1/341 219/121.48 |
| 5,717,187 A * | 2/1998 | Rogozinski ............ | B05B 15/18 219/121.54 |
| 5,796,067 A * | 8/1998 | Enyedy .................. | B23K 10/00 219/121.52 |
| 5,801,282 A * | 9/1998 | Dassel .................... | B01J 19/24 568/570 |
| 5,841,095 A * | 11/1998 | Lu ........................... | H05H 1/38 219/121.48 |
| 5,844,196 A * | 12/1998 | Oakley .................. | B23K 10/006 219/124.02 |
| 5,860,849 A * | 1/1999 | Miller ..................... | B24C 1/045 451/99 |
| 5,874,707 A * | 2/1999 | Iida ......................... | H05H 1/34 219/121.36 |
| 5,886,315 A * | 3/1999 | Lu ........................... | H05H 1/34 219/121.52 |
| 5,897,795 A * | 4/1999 | Lu ........................... | H05H 1/34 219/121.52 |
| 5,968,379 A * | 10/1999 | Zhao ..................... | C23C 16/4586 219/121.52 |
| 5,994,663 A * | 11/1999 | Lu ........................... | H05H 1/34 219/121.48 |
| 6,084,199 A * | 7/2000 | Lindsay ................. | H05H 1/34 219/121.52 |
| 6,096,993 A * | 8/2000 | Marhic ................... | H05H 1/34 219/121.48 |
| 6,133,542 A * | 10/2000 | Dvorak .................. | H05H 1/34 219/76.16 |
| 6,147,318 A * | 11/2000 | Marhic ................... | H05H 1/38 219/121.48 |
| 6,156,995 A * | 12/2000 | Severance, Jr. ......... | H05H 1/34 219/121.59 |
| 6,163,008 A * | 12/2000 | Roberts .................. | H05H 1/34 219/121.48 |
| 6,169,264 B1 * | 1/2001 | Marhic ................... | H05H 1/34 219/121.48 |
| 6,207,923 B1 * | 3/2001 | Lindsay ................. | H05H 1/341 219/121.48 |
| 6,256,873 B1 * | 7/2001 | Tiffany, III ........ | G06K 19/07724 29/827 |
| 6,320,156 B1 * | 11/2001 | Yamaguchi ............ | H05H 1/34 |
| 6,337,460 B2 * | 1/2002 | Kelkar ................... | H05H 1/3405 219/121.51 |
| 6,365,867 B1 * | 4/2002 | Hooper .................. | H05H 1/34 219/121.36 |
| 6,444,945 B1 * | 9/2002 | Maschwitz ........ | H01J 37/32009 219/121.36 |
| 6,483,070 B1 * | 11/2002 | Diehl ...................... | H05H 1/34 219/121.48 |
| 6,525,292 B1 * | 2/2003 | Girold .................... | H05H 1/34 219/121.48 |
| 6,616,767 B2 * | 9/2003 | Zhao .................. | H01L 21/67103 392/416 |
| 6,657,162 B1 * | 12/2003 | Jung ....................... | B23K 9/285 219/137.61 |
| 6,703,581 B2 | 3/2004 | Jones et al. | |
| 6,713,711 B2 * | 3/2004 | Conway ................. | B23K 10/00 219/121.48 |
| 6,717,096 B2 | 4/2004 | Hewett et al. | |
| 6,800,336 B1 * | 10/2004 | Fornsel .................. | H05H 1/42 427/563 |
| 6,852,944 B2 * | 2/2005 | Mackenzie ............. | H05H 1/34 219/121.49 |
| 6,881,921 B2 * | 4/2005 | Horner-Richardson ................... H05H 1/34 219/121.48 |
| 6,888,092 B2 * | 5/2005 | Walters .................. | B23K 9/24 219/121.48 |
| 6,903,301 B2 | 6/2005 | Jones et al. | |
| 6,919,526 B2 | 7/2005 | Kinerson et al. | |
| 6,936,786 B2 | 8/2005 | Hewett et al. | |
| 6,946,616 B2 | 9/2005 | Kinerson et al. | |
| 6,989,505 B2 | 1/2006 | MacKenzie et al. | |

(56) References Cited

U.S. PATENT DOCUMENTS

| | | | | |
|---|---|---|---|---|
| 7,030,337 B2* | 4/2006 | Baker | B23K 26/064 | 219/121.84 |
| 7,161,111 B2* | 1/2007 | Schneider | H05H 1/34 | 219/121.48 |
| 7,196,283 B2* | 3/2007 | Buchberger, Jr. | H01J 37/32082 | 219/121.52 |
| 7,202,440 B2 | 4/2007 | Hewett et al. | | |
| 7,220,937 B2* | 5/2007 | Hofman | H01J 37/32183 | 219/121.52 |
| 7,375,302 B2* | 5/2008 | Twarog | B23K 10/02 | 219/121.48 |
| 7,411,149 B2* | 8/2008 | Schneider | B23K 9/013 | 315/111.21 |
| 7,423,235 B2* | 9/2008 | Severance, Jr. | H05H 1/34 | 219/121.48 |
| 7,598,473 B2 | 10/2009 | Cook et al. | | |
| 7,615,720 B2* | 11/2009 | Sanders | B23K 9/0671 | 219/121.57 |
| 7,622,693 B2* | 11/2009 | Foret | D21C 11/12 | 219/121.36 |
| 7,671,294 B2* | 3/2010 | Belashchenko | H05H 1/44 | 219/121.36 |
| 7,759,599 B2* | 7/2010 | Hawley | H05H 1/34 | 219/121.48 |
| 7,927,094 B2* | 4/2011 | Fong | B29C 45/278 | 425/549 |
| 8,030,592 B2* | 10/2011 | Weidman | H05H 1/42 | 219/121.52 |
| 8,035,055 B2 | 10/2011 | Twarog et al. | | |
| 8,089,025 B2 | 1/2012 | Sanders | | |
| 8,097,828 B2 | 1/2012 | Roberts et al. | | |
| 8,115,136 B2 | 2/2012 | Mather et al. | | |
| 8,203,095 B2* | 6/2012 | Storm | C23C 8/24 | 148/222 |
| 8,338,740 B2* | 12/2012 | Liebold | H05H 1/28 | 219/121.52 |
| 8,373,084 B2* | 2/2013 | Salsich | B23K 10/00 | 219/121.36 |
| 8,389,887 B2 | 3/2013 | Liebold et al. | | |
| 8,395,076 B2 | 3/2013 | Matus | | |
| 8,395,077 B2* | 3/2013 | Duan | H05H 1/34 | 219/121.51 |
| 8,455,786 B2* | 6/2013 | Fang | B23K 10/00 | 219/121.48 |
| 8,546,719 B2* | 10/2013 | Warren, Jr. | B23K 10/00 | 313/231.51 |
| 8,575,510 B2* | 11/2013 | Laurisch | H05H 1/34 | 219/121.48 |
| 8,581,139 B2 | 11/2013 | Severance, Jr. | | |
| 8,624,150 B2* | 1/2014 | Simek | B23K 10/00 | 219/121.48 |
| 8,698,036 B1* | 4/2014 | Zhang | H05H 1/34 | 315/111.21 |
| 8,698,306 B2* | 4/2014 | Yu | H01L 23/49816 | 257/737 |
| 8,759,715 B2* | 6/2014 | Narayanan | B23K 35/368 | 219/130.51 |
| 8,790,447 B2 | 7/2014 | Bieri et al. | | |
| 8,921,731 B2* | 12/2014 | Krink | H05H 1/34 | 313/231.51 |
| 9,157,360 B2 | 10/2015 | Hoy-Peterson et al. | | |
| 9,398,679 B2* | 7/2016 | Namburu | H05H 1/34 | |
| 9,550,251 B2 | 1/2017 | Guilotta | | |
| 9,609,733 B2 | 3/2017 | Severance | | |
| 9,686,850 B2* | 6/2017 | Girold | H05H 1/34 | |
| 9,781,816 B2 | 10/2017 | Cook et al. | | |
| 10,582,605 B2* | 3/2020 | Zhang | B23K 10/02 | |
| 2002/0012756 A1* | 1/2002 | Kuckertz | B29C 59/14 | 427/569 |
| 2002/0117482 A1* | 8/2002 | Hewett | H05H 1/34 | 219/121.48 |
| 2002/0117483 A1* | 8/2002 | Jones | H05H 1/34 | 219/121.48 |
| 2002/0117484 A1* | 8/2002 | Jones | H05H 1/34 | 219/121.57 |
| 2003/0085205 A1* | 5/2003 | Lai | H01J 37/32431 | 219/121.52 |
| 2003/0148709 A1* | 8/2003 | Anand | B24C 1/045 | 451/39 |
| 2004/0000538 A1* | 1/2004 | Conway | B23K 9/291 | 219/121.48 |
| 2004/0177807 A1* | 9/2004 | Pui | C12N 15/87 | 239/690 |
| 2004/0195217 A1* | 10/2004 | Conway | H05H 1/34 | 219/121.48 |
| 2004/0195219 A1* | 10/2004 | Conway | H05H 1/34 | 219/121.52 |
| 2004/0200810 A1* | 10/2004 | Brandt | H05H 1/34 | 219/121.49 |
| 2005/0109736 A1* | 5/2005 | Matus | B23K 10/00 | 219/121.5 |
| 2005/0242068 A1* | 11/2005 | Boisvert | B23K 10/00 | 219/121.36 |
| 2005/0258150 A1* | 11/2005 | Hewett | B23K 9/10 | 219/121.48 |
| 2006/0016789 A1 | 1/2006 | Mackenzie et al. | | |
| 2006/0163216 A1* | 7/2006 | Brandt | H05H 1/36 | 219/121.39 |
| 2006/0289397 A1* | 12/2006 | Mahawili | H05H 1/42 | 219/121.5 |
| 2006/0289398 A1* | 12/2006 | Cook | H05H 1/3405 | 219/121.5 |
| 2006/0289406 A1* | 12/2006 | Helenius | H05H 1/34 | 219/121.48 |
| 2007/0044449 A1* | 3/2007 | O'Brien | F02K 7/10 | 60/39.826 |
| 2007/0045241 A1* | 3/2007 | Schneider | H05H 1/34 | 219/121.36 |
| 2007/0082532 A1* | 4/2007 | Morris | H01R 13/629 | 439/352 |
| 2007/0082533 A1* | 4/2007 | Currier | H05H 1/34 | 439/352 |
| 2007/0090168 A1* | 4/2007 | Snow | B23K 9/328 | 228/101 |
| 2007/0154306 A1* | 7/2007 | Anderson | F01D 11/001 | 415/209.2 |
| 2007/0181540 A1* | 8/2007 | Lindsay | H05H 1/34 | 219/121.5 |
| 2007/0210034 A1* | 9/2007 | Mather | B23K 10/006 | 219/121.5 |
| 2007/0210035 A1 | 9/2007 | Twarog et al. | | |
| 2007/0262060 A1* | 11/2007 | Roberts | H05H 1/34 | 219/121.5 |
| 2008/0083711 A1* | 4/2008 | Twarog | H05H 1/34 | 219/121.48 |
| 2008/0116179 A1* | 5/2008 | Cook | H05H 1/28 | 219/121.48 |
| 2008/0210669 A1* | 9/2008 | Yang | H05H 1/34 | 219/121.49 |
| 2008/0217305 A1* | 9/2008 | Sanders | H05H 1/34 | 219/121.52 |
| 2008/0237356 A1* | 10/2008 | Singleton | H05K 3/284 | 235/492 |
| 2008/0308535 A1* | 12/2008 | Rego | H05H 1/2406 | 219/121.52 |
| 2009/0026180 A1* | 1/2009 | Yang | B23K 10/00 | 219/121.49 |
| 2009/0027782 A1* | 1/2009 | Takahashi | B29D 11/00903 | 427/508 |
| 2009/0045174 A1* | 2/2009 | Haberler | H05H 1/34 | 219/121.52 |
| 2009/0152255 A1* | 6/2009 | Ma | B23K 9/295 | 219/137.61 |
| 2009/0206721 A1* | 8/2009 | Foret | F22B 1/281 | 313/231.01 |
| 2009/0230095 A1* | 9/2009 | Liebold | B23K 10/00 | 165/104.19 |

(56) References Cited

U.S. PATENT DOCUMENTS

| | | | | |
|---|---|---|---|---|
| 2009/0230097 A1* | 9/2009 | Liebold | H05H 1/28 | 219/121.49 |
| 2009/0277882 A1* | 11/2009 | Bornemann | H05H 1/34 | 29/592.1 |
| 2010/0078408 A1* | 4/2010 | Liebold | H05H 1/28 | 29/890.02 |
| 2010/0084381 A1* | 4/2010 | Indraczek | B23K 10/022 | 219/121.45 |
| 2010/0133241 A1* | 6/2010 | Wilhelm | B23K 9/167 | 219/121.45 |
| 2010/0264120 A1* | 10/2010 | Reinke | H05H 1/34 | 219/121.51 |
| 2011/0042358 A1* | 2/2011 | Albanese | H05H 1/42 | 219/121.5 |
| 2011/0284502 A1* | 11/2011 | Krink | H05H 1/34 | 219/121.5 |
| 2012/0012560 A1* | 1/2012 | Roberts | H05H 1/34 | 219/74 |
| 2012/0012565 A1* | 1/2012 | Zhang | B23K 10/02 | 219/121.48 |
| 2012/0036832 A1* | 2/2012 | Hoy-Petersen | F01N 13/004 | 60/274 |
| 2012/0055907 A1* | 3/2012 | Allimant | H05H 1/34 | 219/121.51 |
| 2012/0058649 A1* | 3/2012 | Okumura | H05H 1/34 | 438/798 |
| 2012/0060691 A1* | 3/2012 | Bieri | B01D 45/12 | 55/459.1 |
| 2012/0103946 A1* | 5/2012 | Krink | B23K 10/02 | 219/121.67 |
| 2012/0152913 A1 | 6/2012 | Mather et al. | | |
| 2012/0181257 A1* | 7/2012 | Mather | B23K 10/006 | 219/121.36 |
| 2012/0246922 A1 | 10/2012 | Hussary et al. | | |
| 2012/0248073 A1* | 10/2012 | Conway | H05H 1/28 | 219/121.49 |
| 2012/0261392 A1* | 10/2012 | Barnett | H05H 1/3405 | 219/121.59 |
| 2013/0043222 A1* | 2/2013 | Leiteritz | B23K 9/013 | 219/121.48 |
| 2013/0043223 A1* | 2/2013 | Leiteritz | B23K 9/28 | 219/121.48 |
| 2013/0043224 A1* | 2/2013 | Leiteritz | H05H 1/34 | 219/121.52 |
| 2013/0087535 A1* | 4/2013 | Barnett | B23K 10/006 | 219/121.48 |
| 2013/0126487 A1* | 5/2013 | Crowe | H05H 1/38 | 219/121.48 |
| 2013/0153545 A1* | 6/2013 | Kim | H05H 1/36 | 219/121.5 |
| 2013/0248497 A1* | 9/2013 | Stoeger | F23D 14/42 | 219/628 |
| 2014/0021172 A1* | 1/2014 | Sanders | H05H 1/34 | 29/428 |
| 2014/0023856 A1* | 1/2014 | Bisges | H05H 1/42 | 428/328 |
| 2014/0069895 A1* | 3/2014 | Brine | B23K 10/006 | 219/121.44 |
| 2014/0076861 A1* | 3/2014 | Cornelius | B23K 10/003 | 219/121.52 |
| 2014/0113527 A1* | 4/2014 | Lindsay | B23K 26/702 | 451/8 |
| 2014/0217070 A1* | 8/2014 | Pikus | B23K 7/00 | 266/74 |
| 2015/0076819 A1* | 3/2015 | Mather | H05H 1/34 | 285/391 |
| 2015/0129562 A1* | 5/2015 | Severance, Jr. | H05H 1/34 | 219/121.48 |
| 2015/0181686 A1* | 6/2015 | Schulze | B23K 35/00 | 219/121.48 |
| 2015/0273617 A1* | 10/2015 | Gullotta | H05H 1/36 | 219/121.54 |
| 2015/0319835 A1* | 11/2015 | Sanders | B23K 10/006 | 219/121.48 |
| 2015/0319836 A1* | 11/2015 | Sanders | B23K 10/006 | 219/121.49 |
| 2015/0332071 A1* | 11/2015 | Hoffa | H05H 1/34 | 340/10.2 |
| 2015/0351213 A1* | 12/2015 | Crowe | F16F 1/06 | 219/121.48 |
| 2016/0050740 A1* | 2/2016 | Zhang | B23K 10/02 | 29/825 |
| 2016/0120015 A1 | 4/2016 | Crowe | | |
| 2016/0165711 A1 | 6/2016 | Zhang et al. | | |
| 2016/0165712 A1 | 6/2016 | Zhang et al. | | |
| 2016/0174353 A1* | 6/2016 | Mitra | H05H 1/42 | 219/121.5 |
| 2016/0221108 A1* | 8/2016 | Hoffa | G05B 19/182 | |
| 2016/0314938 A1* | 10/2016 | Park | H01J 37/32055 | |
| 2016/0375519 A1* | 12/2016 | Crowe | H05H 1/34 | 219/121.57 |
| 2017/0042014 A1 | 2/2017 | Sanders et al. | | |
| 2018/0007774 A1 | 1/2018 | Crowe | | |

FOREIGN PATENT DOCUMENTS

| | | |
|---|---|---|
| EP | 0875329 A1 | 11/1998 |
| EP | 1117279 A1 | 7/2001 |
| FR | 2700982 A1 | 8/1994 |
| JP | 57044467 A | 3/1982 |
| JP | 2011014459 A | 1/2011 |
| JP | 4688450 B2 | 5/2011 |
| JP | 4707108 B2 | 6/2011 |
| RU | 2066263 C1 | 9/1996 |
| RU | 95105277 A | 4/1997 |
| RU | 2354460 C1 | 10/2008 |
| RU | 150194 U1 | 2/2015 |
| WO | WO 9621339 A1 | 7/1996 |
| WO | WO 03089183 A1 | 10/2003 |
| WO | WO 2013103466 A1 | 7/2013 |
| WO | WO 2015073522 A1 | 5/2015 |

OTHER PUBLICATIONS

Centricut catalog "2013-2014 Plasma torches and consumables", 68 pages.
Drawing of Hypertherm Part No. 120934, 2000 (redacted).
International Search Report and Written Opinion to corresponding PCT Application No. PCT/US2015/044884 dated Dec. 9, 2015. 15 pages.
Invitation to Pay Additional Fees for corresponding PCT application: PCT/US2015/044884, Sep. 28, 2015, 9 pages.
Komatsu America Industries, LLC: "Next Generation Twister TFP6062-300A Power Supply Units", Retrieved from the internet at: http://www.komatsuplasma.com/kai/ctd/en/tfp6062/pdf/TFP6062_Brochure.pdf, printed Oct. 27, 2016, 2 pages.
Komatsu America Industries, LLC: "TFPL Twister Series", Retrieved from the internet at: http://fineplasma.com/kai/ctd/en/tfp/pdf/eTFP.pdf, printed Oct. 27, 2016, 6 pages.
Thermal Dynamics XT™—300 Brochure, May 7, 2007,http://www.mitausteel.lv/wp-content/uploads/2013/11/V- XT300-Torch.pdf, 6 pages.
Thermal Dynamics, "XT-301 Automated Plasma Cutting Torch", retrieved from the internet at: http://victortechnologies.com/IM_Uploads/DocLib_5849_XT-301%20Torch%20for%20use%20w%20Merlin%201000%20Brochure%20(63-2524)_Nov2005.pdf: Thermadyne.
Trumpf Inc.,"TruLaser: Cost-effective cutting through thick and thin", Retrieved from the internet at: http://www.us.trumpf.com/fileadmin/DAM/US.trumpf.com/Brochures/2D_Laser/TruLaser_US_10-12.pdf, printed Oct. 26, 2016, 32 pages.
Welding Magazine, "Plasma cutting system for mild steel",Oct. 2008, p. 34 retrieved from the internet at: http://search.proquest.com/professional/printviewfile?accountid=157282.
Welding Magazine, "Plasma cutting systems and products: new and or upgraded plasma cutting systems and torches have been designed

(56) References Cited

OTHER PUBLICATIONS to offer increased flexibility and to boost performance and productivity". Retrieved from the internet at: http://search.proquest.com/professional/printviewfile?accountid=157282,Apr. 2007, pp. 36-38.

* cited by examiner

COST EFFECTIVE CARTRIDGE FOR A PLASMA ARC TORCH

CROSS REFERENCE TO RELATED APPLICATION

This application is a continuation application of Ser. No. 14/824,946, filed on Aug. 12, 2015 and entitled "Cost Effective Cartridge for a Plasma Arc Torch," which claims the benefit of and priority to U.S. Provisional Patent Application No. 62/036,393, filed Aug. 12, 2014. The entire content of both applications is owned by the assignee of the instant application and incorporated herein by reference in its entirety.

TECHNICAL FIELD

The present invention generally relates to consumables for a plasma arc torch, and more particularly, to one or more replaceable, low-cost cartridges of a plasma arc torch having multiple integrated components.

BACKGROUND

Thermal processing torches, such as plasma arc torches, are widely used for high temperature processing (e.g., heating, cutting, gouging and marking) of materials. A plasma arc torch generally includes a torch body, an electrode mounted within the torch body, an emissive insert disposed within a bore of the electrode, a nozzle with a central exit orifice mounted within the torch body, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

One method for producing a plasma arc in a plasma arc torch is the contact start method. The contact start method involves establishing physical contact and electrical communication between the electrode and the nozzle to create a current path between them. The electrode and the nozzle can cooperate to create a plasma chamber within the torch body. An electrical current is provided to the electrode and the nozzle, and a gas is introduced to the plasma chamber. Gas pressure builds up until the pressure is sufficient to separate the electrode and the nozzle. The separation causes an arc to be formed between the electrode and the nozzle in the plasma chamber. The arc ionizes the introduced gas to produce a plasma jet that can be transferred to the workpiece for material processing. In some applications, the power supply is adapted to provide a first electrical current known as a pilot current during generation of the arc and a second current known as a transferred arc current when the plasma jet has been transferred to the workpiece.

Various configurations are possible for generating the arc. For example, the electrode can move within the torch body away from the stationary nozzle. Such a configuration is referred to as the "blow-back" contact start method because the gas pressure causes the electrode to move away from the workpiece. A problem with such systems relates to precise alignment of the nozzle and electrode consumables, which significantly impacts life expectancy of the consumables and material processing/cut quality. In another configuration, the nozzle can move away from the relatively stationary electrode. Such a configuration is referred to as the "blow-forward" contact start method because the gas pressure causes the nozzle to move toward the workpiece.

Existing plasma cutting systems include a large array of consumables available for use with different currents and/or operating modes. The large number of consumable options requires large part counts and inventories for users, and can confuse users and increase the possibility of installing incorrect consumables. The large number of consumable options can also cause lengthy torch setup time(s) and make it difficult to transition among cutting processes that require different arrangements of consumables in the torch, arrangement and installation of which is often performed in the field. For example, before a cutting operation, selecting and installing the correct set of consumables for a particular cutting task can be burdensome and time-consuming. Furthermore, selection, assembly, and installation of these components in the field can cause alignment issues or compatibility issues when old components are used with new components. During torch operation, existing consumables can experience performance issues such as failing to maintain proper consumable alignment and spacing. Furthermore, current consumables include substantial amounts of expensive materials (e.g., Vespel™) and often require a relatively complex manufacturing process, which lead to significant manufacturing costs and inhibit their widespread commercialization, production and adoption. What is needed is a new and improved consumable platform that decreases manufacturing costs and time, decreases part count, increases system performance (e.g., component alignment, cut quality, consumable life, variability/versatility, etc.), and eases installation and use of consumables by end users.

SUMMARY

The present invention provides one or more cost effective cartridge designs for a plasma arc torch, such as for a manually-operated, air-cooled plasma arc torch. Generally, because a cartridge includes a suite of two or more consumable components, it provides ease of use and shortens the time for installation into a plasma arc torch in comparison to installing each consumable component individually. In addition, the use of a cartridge in a torch improves component alignment and cut consistency. However, manufacturing and material costs can prohibit the widespread commercialization and production of cartridges. The present invention solves this problem by providing one or more cost effective cartridge designs that facilitate cartridge commercialization and production and improve their installation.

The invention, in one aspect, features a cartridge for an air-cooled plasma arc torch. The cartridge comprises a swirl ring and a cap. The swirl ring includes a molded thermoplastic elongated body having a substantially hollow portion, the molded thermoplastic elongated body having a distal end and a proximal end and configured to receive an electrode within the hollow portion. The swirl ring also includes a plurality of gas flow openings defined by the distal end of the elongated body and configured to impart a swirling motion to a plasma gas flow for the plasma arc torch. The swirl ring further includes a nozzle retention feature on a surface of the elongated body at the distal end for retaining a nozzle to the elongated body. The cap is affixed to the proximal end of the elongated body of the swirl ring. The cap substantially encloses the proximal end of the elongated body.

In some embodiments, the cap is formed of an electrically conductive material. The cap can be configured to retain the electrode within the cartridge and pass an electrical current to the electrode. The cap can comprise a biasing surface for physically contacting a resilient element that biases against a proximal end of the electrode. Additionally, the cap can comprise a substantially hollow body configured to retain the resilient element between the biasing surface and the proximal end of the electrode.

In some embodiments, the body of the cap has a substantially uniform thickness. In some embodiments, the cap includes at least one vent hole.

In some embodiments, the cap comprises a contact surface for facilitating electrical contact with a corresponding contact surface of the electrode when the plasma arc torch is operated in a transferred arc mode. The contact surface of the cap is characterized by the absence of contact with the corresponding contact surface of the electrode during initiation of a pilot arc. The contact surface can be configured to physically contact the corresponding contact surface of the electrode when the torch is operated in the transferred arc mode.

In some embodiments, the plurality of gas flow openings of the swirl ring include slots defined by a plurality of extensions disposed about the distal end of the elongated body of the swirl ring, each slot situated between a pair of the extensions.

In some embodiments, the nozzle retention feature includes a groove located on an external surface of the extensions. Retention of the nozzle to the swirl ring can be via one of snap fit, threading or crimping. In some embodiments, engagement between the cap and the swirl ring is by one of crimping, snap fit, or threading.

In some embodiments, the elongated body of the swirl ring is molded from a thermoplastic material comprising a polymer formed of ether and ketone molecules. The thermoplastic material can have one or more properties comprising (i) a glass transition temperature (Tg) of greater than about 320 Fahrenheit (F), (ii) a coefficient of linear thermal expansion (CLTE) of less than about 22 micro-inch/inch-Fahrenheit (micro.in/in.F) below Tg, (iii) a CLTE of less than about 55 micro.in/in.F above Tg, (iv) a melting point of greater than about 720 Fahrenheit, and (v) a dielectric strength of greater than about 480 kilo-volt/inch.

In some embodiments, the ratio of an axial length (L) of each gas flow opening to an average radius (R) between the radius of the electrode and the radius of an inner wall of the swirl ring is less than about 0.5. In some embodiments, the plurality of gas flow openings are disposed in a single layer about the distal end of the elongated body, each gas flow opening having an offset of about 0.040 inches between an opening in an inner wall of the swirl ring and an opening on an outer wall of the swirl ring.

In another aspect, a molded swirl ring for an air-cooled plasma arc torch is provided. The molded swirl ring comprises a molded thermoplastic elongated body comprising a substantially hollow portion. The molded thermoplastic elongated body has a distal end and a proximal end and configured to receive an electrode within the hollow portion. The molded swirl ring also includes a plurality of molded gas flow openings each extending from an interior surface to an exterior surface of the elongated body. The molded gas flow openings are disposed about the distal end of the elongated body and configured to impart a swirl to a plasma gas flow of the plasma arc torch. The molded swirl ring further includes a nozzle retention surface on the body for retaining a nozzle at the distal end of the elongated body.

In some embodiments, the plurality of gas flow openings include slots defined by a plurality of extensions disposed about the distal end of the elongated body, each slot situated between a pair of the extensions. The distal end of the elongated body of the swirl ring and the nozzle can cooperatively define the plurality of gas flow openings.

In some embodiments, the nozzle retention surface includes a nozzle retention feature located on an external surface of the extensions. The nozzle retention feature can comprise a groove configured to receive a portion of the nozzle via crimping. In some embodiments, the nozzle retention surface comprises a sloped surface configured to receive a portion of the nozzle via crimping.

In some embodiments, the swirl ring is configured to engage the nozzle via one of snap fit or threading. In some embodiments, the swirl ring is configured to engage the nozzle via crimping.

In some embodiments, the elongated body is molded from a thermoplastic material comprising a polymer formed of ether and ketone molecules. The thermoplastic material can further comprise one or more additives.

In another aspect, an assembly for an air-cooled plasma arc torch is provided. The assembly comprises an electrode, a swirl ring molded from a thermoplastic material, a nozzle, and a cap. The swirl ring comprises a nozzle retention surface at a distal end and a cap retention element at a proximal end. The nozzle is fixedly secured to the distal end of the swirl ring via the nozzle retention surface, where the nozzle includes an exit orifice at a distal end of the nozzle. The cap is fixedly secured to the proximal end of the swirl ring via the cap retention element. The cap is configured to enclose the swirl ring at the proximal end. The securement of the swirl ring, the nozzle and the cap creates a chamber in which the electrode is permanently disposed and aligned relative to the nozzle.

In some embodiments, the nozzle retention surface comprises a sloped surface and the nozzle is secured to the distal end of the swirl ring by crimping at least a portion of the nozzle against the sloped surface. The crimping of the nozzle to the nozzle retention can establish (1) a radial centering of the nozzle exit orifice within the chamber with respect to a distal end of the electrode to within 0.005 inches, and (2) a longitudinal positioning of the electrode within the chamber between the distal end of the electrode and the nozzle exit orifice during a transferred arc operation of the assembly to within 0.030 to 0.060 inches.

In some embodiments, the cap retention element comprises a groove configured to secure the swirl ring by at least one of crimping, threading, or snap fit. The securement of the cap to the swirl ring via the cap retention element can establish a longitudinal positioning of the electrode within the chamber between a distal end of the electrode and the nozzle exit orifice during a transferred arc operation of the assembly to within 0.030 to 0.060 inches.

In some embodiments, the assembly further comprises a resilient element between a biasing surface of the cap and the electrode, the resilient element physically contacting the electrode and imparting a separation force upon the electrode. The resilient element can pass substantially all of a pilot arc current to the electrode when the plasma arc torch is operated in a pilot arc mode. The cap can comprise a hollow body for maintaining the resilient element substantially therein. In some embodiments, the resilient element comprises at least one of a spring or wire.

In some embodiments, the assembly further comprises an o-ring configured to substantially surround the proximal end of the swirl ring to seal the swirl ring against a body of the plasma arc torch.

In another aspect, a cap is provided for a contact start plasma arc torch configured for electrical communication with an electrode. The cap comprises a substantially hollow body, formed from an electrically conductive material, configured to receive a resilient element. The hollow body has a substantially uniform thickness. The cap also includes a biasing surface at a proximal end of the cap for physically contacting the resilient element. The cap further includes an interior contact surface at the distal end for physically contacting, during a transferred arc mode of the plasma arc torch, a corresponding surface at the proximal end of the electrode. The contact surface is characterized by an absence of contact with the corresponding surface of the electrode during a pilot arc mode of the plasma arc torch.

In some embodiments, the contact surface is configured to pass at least a portion of a transferred arc current from the power supply to the electrode during the transferred arc mode. Additionally, the resilient element can be configured to pass substantially all of a pilot arc current from the power supply to the electrode during the pilot arc mode.

In some embodiments, the cap further includes a retention element for connection to a swirl ring via one of crimping, snap fit or threading. In some embodiments, the cap further includes at least one vent hole. In some embodiments, the cap further comprises a circular tunnel portion that includes the biasing surface and is configured to house at least a portion of the resilient element. In some embodiments, the cap further comprises a depressed center extending away from the proximal end that includes the contact surface.

In some embodiments, the cap is formed via a stamping process.

In another aspect, a method for aligning a plurality of components in a cartridge is provided. The method includes molding a thermoplastic material to form a swirl ring comprising a distal end, a proximal end and a hollow body. The method also includes disposing an electrode inside of the hollow body of the swirl ring and retaining the electrode to the cartridge by fixedly securing the nozzle to the distal end of the swirl ring. The method further includes longitudinally aligning the electrode relative to the nozzle by fixedly securing an end cap to the proximal end of the swirl ring, thereby establishing the longitudinal alignment during a transferred arc operation of the cartridge when a gas flow is used to bias the electrode into contact with the end cap.

In some embodiments, the method further comprises forming the end cap via a stamping process. In some embodiments, the method further comprises radially aligning the electrode by restraining a radial motion of the electrode within the hollow body of the swirl ring.

In some embodiments, the longitudinal alignment comprises restraining a longitudinal motion of the electrode to within a blow-back distance defined by a distal end of the electrode and an exit orifice of the nozzle during the transferred arc operation.

In some embodiments, fixed securing the nozzle to the distal end of the swirl ring comprises crimping a portion of the nozzle into a retention surface on the distal end of the swirl ring.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
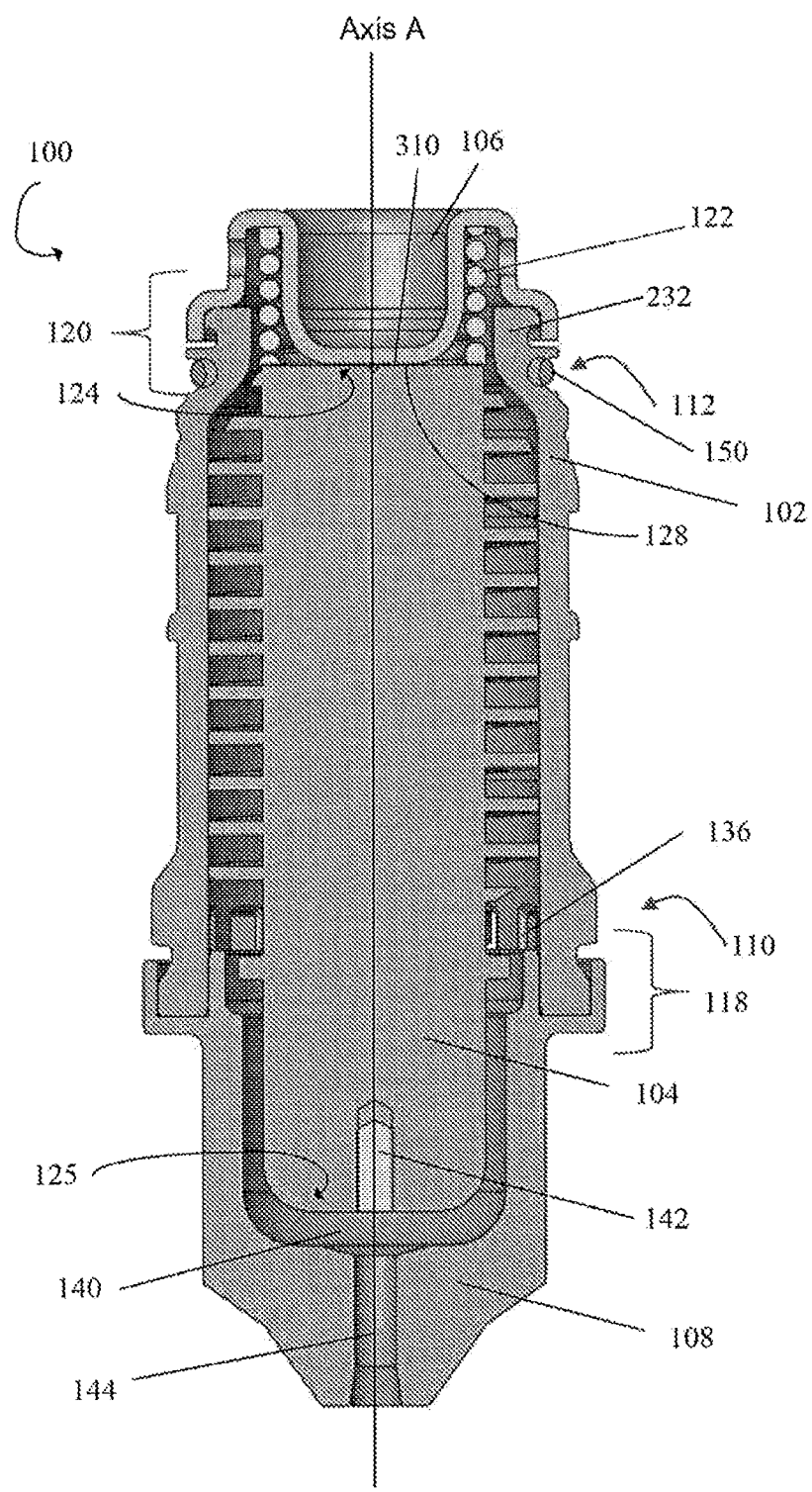
FIG. 1 is a cross-sectional view of an exemplary cartridge for a plasma arc torch, according to an illustrative embodiment of the invention.

FIG. 1 is a cross-sectional view of an exemplary cartridge 100 for a plasma arc torch, according to an illustrative embodiment of the invention. As shown, the cartridge 100 includes an end cap 106, a swirl ring 102, an electrode 104, and a nozzle 108 oriented substantially symmetrically about the longitudinal axis A. The cartridge 100 can additionally include a resilient element 122 and/or a sealing device 150. The cartridge 100 can use a blow-back contact starting mechanism for contact starting the plasma arc torch upon assembly into the torch. Specifically, the electrode 104 can be a spring-forward electrode, which means that the resilient element 122 (e.g., a spring) can exert a separating force on the proximal end 124 of the electrode 104 to bias the electrode 104 away from the end cap 106 and toward the nozzle 108.

Figure 2:
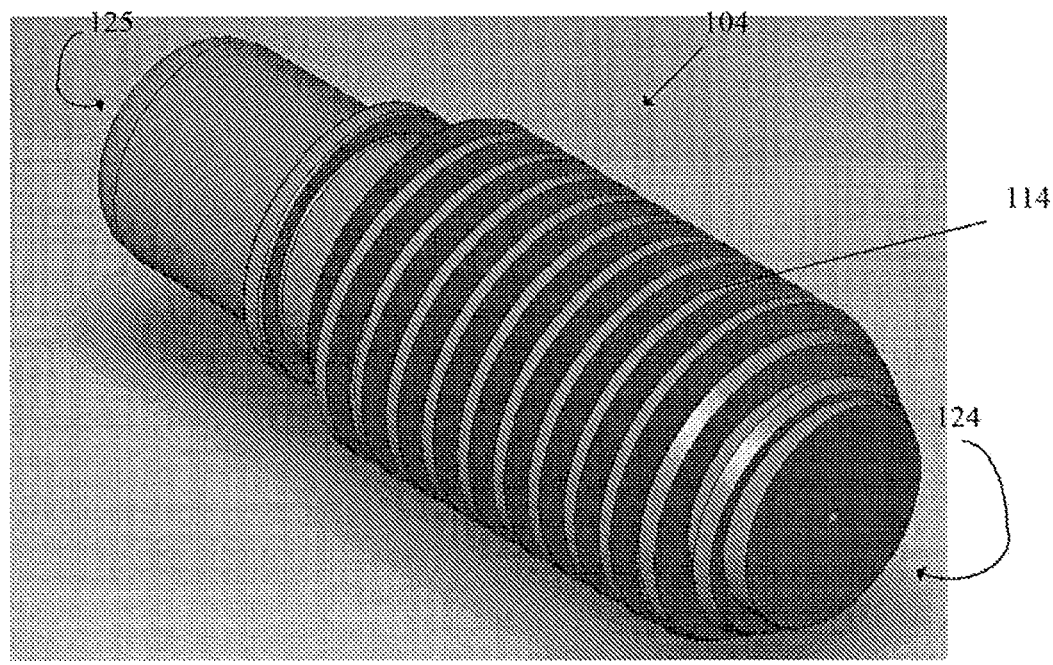
FIG. 2 is an isometric view of the electrode of the cartridge of FIG. 1, according to an illustrative embodiment of the invention.

FIG. 2 is an isometric view of the electrode 104, according to an illustrative embodiment of the invention. As shown, the electrode 104 includes a set of spiral-shaped fins 114 for directing a gas flow and facilitating cooling of the cartridge 100. An emissive insert 142 (i.e., emitter), as shown in FIG. 1, can be disposed in the distal end 125 of the electrode 104 so that an emission surface is exposed. The insert 142 can be made of hafnium or other materials that possess suitable physical characteristics, including corrosion resistance and a high thermionic emissivity. Forging, impact extrusion, or cold forming can be used to initially form the electrode 104 prior to finish machining the component.

Figure 3:
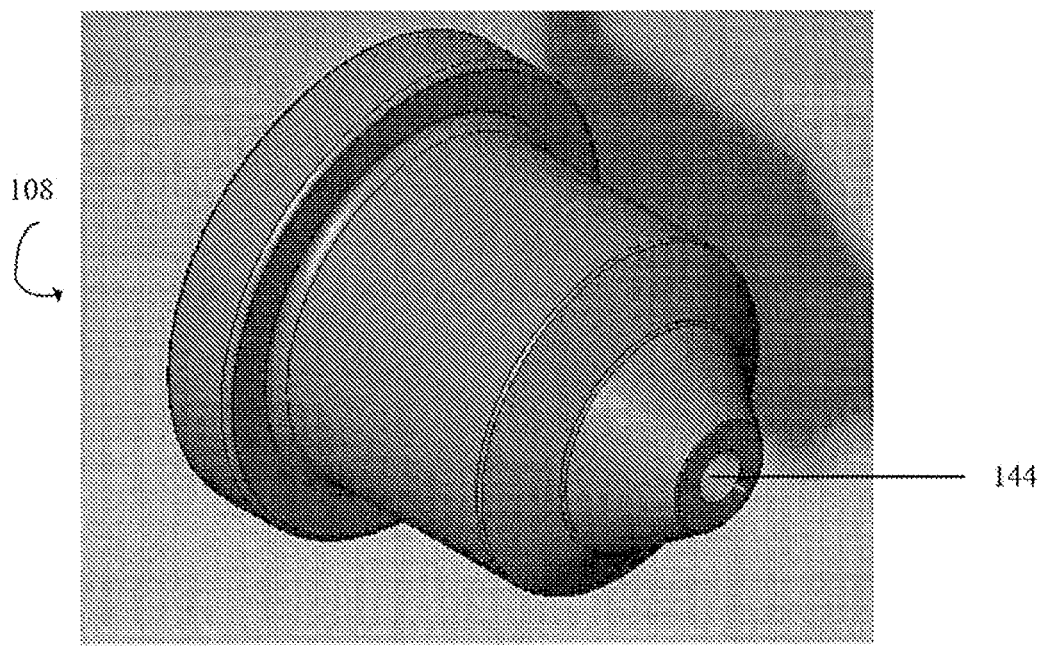
FIG. 3 is an isometric view of the nozzle of the cartridge of FIG. 1, according to an illustrative embodiment of the invention.

The nozzle 108 can be spaced from the distal end 125 of the electrode 104 and define, in relation to the electrode 104, a plasma chamber 140. FIG. 3 is an isometric view of the nozzle 108, according to an illustrative embodiment of the invention. The nozzle 108 includes a centrally-located exit orifice 144 for introducing a plasma arc, such as an ionized gas jet, to a workpiece (not shown) to be cut.

In some embodiments, the swirl ring 102 has a set of radially spaced gas flow openings 136 configured to impart a tangential velocity component to a gas flow for the plasma arc torch, causing the gas flow to swirl. This swirl creates a vortex that constricts the arc and stabilizes the position of the arc on the insert 142. In some embodiments, the sealing device 150, such as an o-ring, can be located on an external surface of the swirl ring 102 at its proximal end 112 to engage an internal surface of the plasma arc torch body (not shown) when the cartridge 100 is installed into the plasma arc torch body. The sealing device 150 is configured to provide a leak-proof seal of fluids (e.g., gases) between the cartridge 100 and the plasma arc torch body at that location.

Figure 4A:
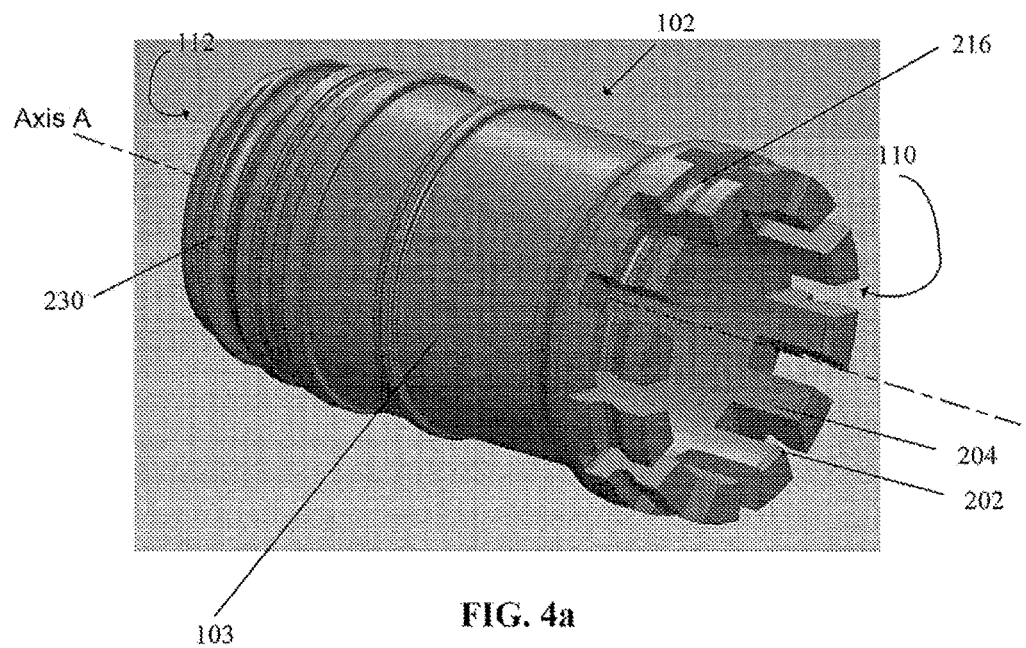
FIGS. 4a and 4b are isometric and profile views of the swirl ring of the cartridge of FIG. 1, respectively, according to an illustrative embodiment of the invention.
Figure 4B:
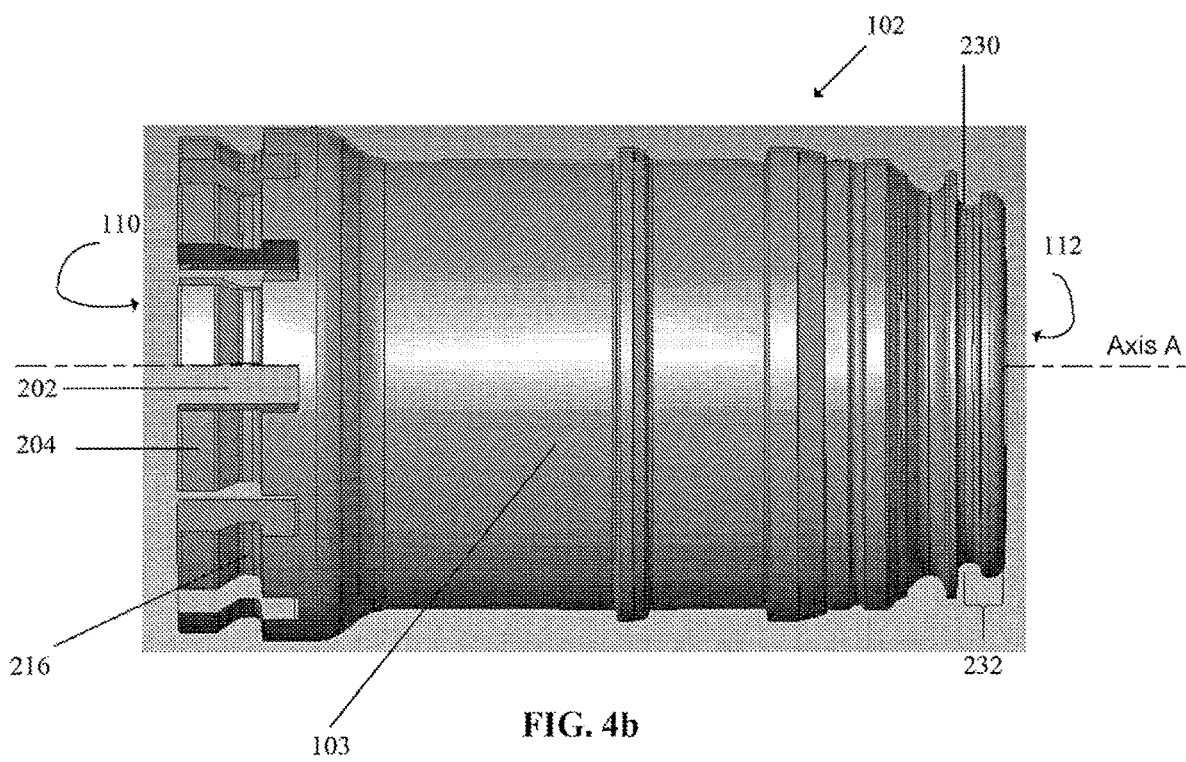

FIGS. 4a and 4b are isometric and profile views of the swirl ring 102 of the cartridge 100 of FIG. 1, respectively, according to an illustrative embodiment of the invention. As shown, the swirl ring 102 can be defined by a substantially hollow, elongated body 103 having the distal end 110 and the proximal end 112 along the longitudinal axis A. The distal end 110 of the swirl ring 102 is characterized as the end that is closest to a workpiece when operating the cartridge 100 within the plasma arc torch, and the proximal end 112 is the opposite of the distal end 110 along the longitudinal axis A. In some embodiments, the hollow body 103 of the swirl ring 102 is dimensioned to receive the electrode 104 and substantially extend over the length of the electrode 104 along the longitudinal axis A. The inner wall of the swirl ring 102 can thus radially align the electrode 104 by limiting a radial movement of the electrode 104. An interface 118 can be formed between the distal end 110 of the swirl ring 102 and the nozzle 108 to join the two consumable components together as a part of the cartridge 100. Another interface 120 can be formed between the proximal end 112 of the swirl ring 102 and the end cap 106 to join the two consumable components together as a part of the cartridge 100. In general, the interface 118 and/or the interface 120 form a chamber in which the electrode 104 is permanently disposed and aligned (longitudinally and radially) relative to the nozzle 108 and the end cap 106.

In some embodiments, the one or more gas flow openings 136 of the swirl ring 102 are disposed about the distal end 110 of its elongated body 103, such as around a circumference of its distal end 110. In some embodiments, the one or more gas flow openings 136 are molded. Each gas flow opening 136 can extend from an interior surface to an exterior surface of the elongated body 103 and is oriented to impart a swirling motion relative to the axis A to the gas (e.g., air) flowing therethrough. Each gas flow opening 136 can be circular or non-circular (e.g., rectangular, squared and/or square-cornered) in geometry. In some embodiments, the gas flow openings 136 have substantially uniform dimensions. In some embodiments, as shown in FIGS. 4a and 4b, the gas flow openings 136 are at least partially defined by slots 202 at the distal end 110 of the elongated body 103 of the swirl ring 102. These gas flow slots 202 are formed by a plurality of extensions 204 spaced apart at regular or non-regular intervals around the circumference of the distal end 110, where each slot 202 is situated between a pair of the extensions 204. Upon the swirl ring 102 being securely affixed to the nozzle 108, the slots 202 are closed off by the proximal end of the nozzle 108 to create bounded holes. Hence, each gas flow opening 136 can be a two-piece composite opening cooperatively defined by the nozzle 108 and the swirl ring 102.

In some embodiments, to form the interface 118 between the swirl ring 102 and the nozzle 108, the swirl ring 102 can include a nozzle retention surface 216 (e.g., interior and/or exterior surface) of the elongated body 103 for securely attaching the nozzle 108 at its distal end 110. In one example, as illustrated in FIGS. 4a and b, the nozzle retention surface 216 can be a feature, such as one or more grooves located on the external surface of the elongated body 103, such as on the extensions 204. The nozzle retention surface 216 can capture the nozzle 108 through one of snap fit, crimping, or threading to form the interface 118. In a crimping example, a portion of the nozzle 108 can be crimped against and into the groove 216 to securely affix the nozzle 108 to the swirl ring 102. Alternatively, a similar retention surface can be disposed on the nozzle 108 to retain the swirl ring 102 thereto. Other manufacturing and assembly options are available and viable to connect the two components. For example, the nozzle 108 can be over-molded onto the swirl ring 102 to form the interface 118.

Figure 5A:
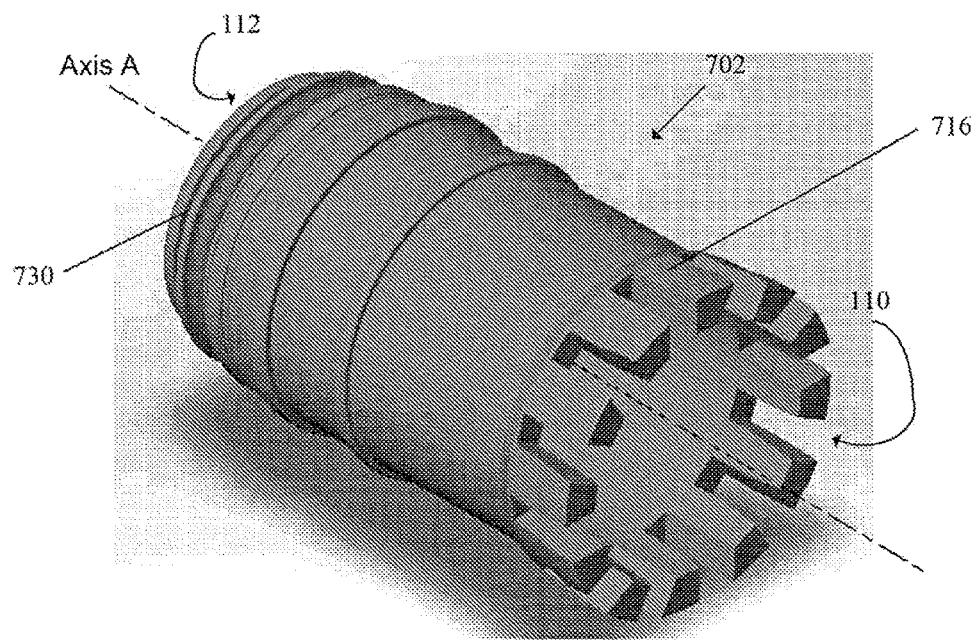
FIGS. 5a and 5b are isometric and sectional views of another swirl ring design compatible with the cartridge of FIG. 1, respectively, according to an illustrative embodiment of the invention.
Figure 5B:
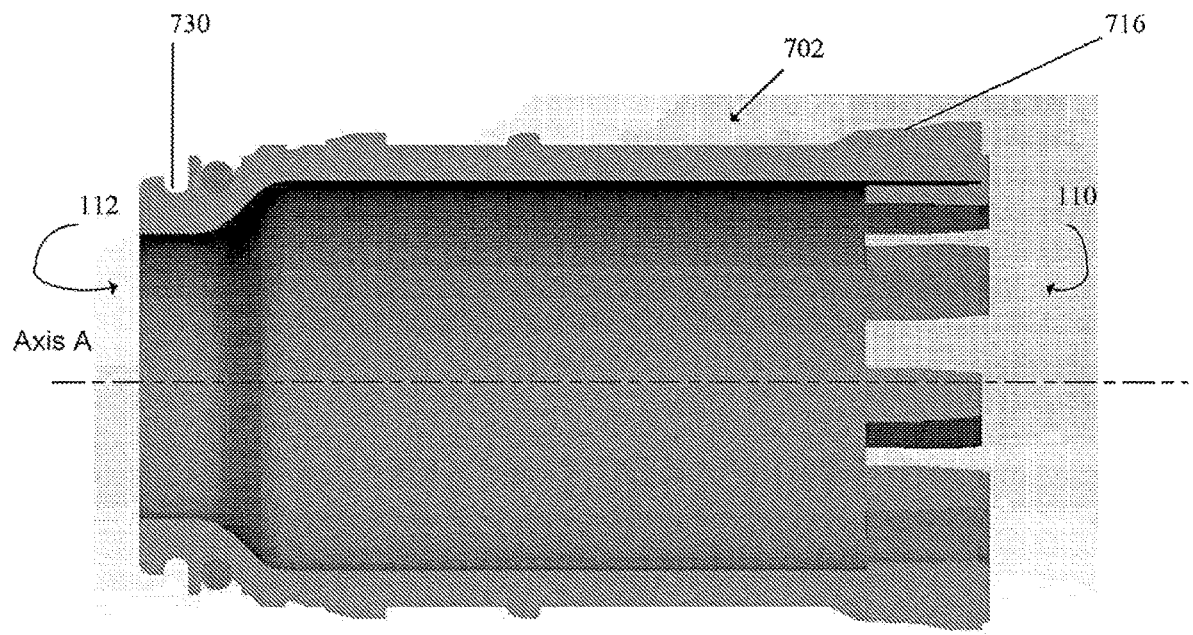

FIGS. 5a and b are isometric and sectional views of another swirl ring 702 compatible with the cartridge 100 of FIG. 1, respectively. As shown, the swirl ring 702 is substantially similar to the swirl ring 102 except that the nozzle retention surface 716 of the swirl ring 702 comprises a sloped surface at a tapered angle relative to the longitudinal axis A. The sloped surface 716 can beis adapted to capture the nozzle 108 through one of snap fit, crimping, or threading to form the interface 118 of FIG. 1.

In some embodiments, as shown in FIGS. 4a and b, to form the interface 120 between the swirl ring 102 and the end cap 106, the swirl ring can include a cap retention feature 230 located on a surface (e.g., interior and/or exterior surface) of the elongated body 103 for securely retaining the end cap 106 at its proximal end 112. The cap retention feature 230 can be one or more grooves that capture the end cap 106 through one of snap fit, crimping, or threading to form the interface 120. For example, a portion of the end cap 106 can be crimped into the groove(s) 230 to securely affix the end cap 106 to the swirl ring 102. In some embodiments, as shown in FIGS. 1 and 4b, a lip portion 232 of the proximal end 112 of the swirl ring 102 is inserted inside of the end cap 106 after the two components are coupled together. Alternatively, a similar retention feature can be disposed about the end cap 106 to join the swirl ring 102. Other manufacturing and assembly options are available and viable to connect the two components. For example, the end cap 106 can be over-molded onto the swirl ring 102 to form the interface 120. A similar cap retention feature 730 can be located on a surface of the swirl ring 702 of FIGS. 5a and b and provide substantially the same function as the cap retention feature 230.

In general, each of the retention surfaces/elements 216, 230 of FIGS. 4a and b simplifies alignment of the parts in the cartridge 100 in comparison to an operator having to perform alignment of individual components without any structural guidance. In some embodiments, the locking of the swirl ring 102 to the nozzle 108 at the interface 118 via the retention element 216 aligns the two components relative to each other and further retains the electrode 104 in the chamber formed by the locking of the swirl ring 102 and the nozzle 108. The inner wall of the swirl ring 102 can radially align the electrode 104 such that there is a relatively small gap between the inner wall of the swirl ring 102 and the radial fins 114 of the electrode 104, thereby limiting a radial motion of the electrode 104. This thus establishes a radial centering of the nozzle exit orifice 144 with respect to the distal end 125 of the electrode 104 within the chamber, such as within a tolerance of about 0.005 inches. In some embodiments, the locking of the swirl ring 102 to the end cap 106 at the interface 120 via the retention element 230 aligns the two components relative to each other and further longitudinally aligns the electrode 104 in the chamber. For example, after the swirl ring 102 and the end cap 106 are joined, the depth of the depressed center 304 of the end cap 106 controls how far back the electrode 104 can move longitudinally toward the proximal end 124 in relation to the nozzle 108 during a transferred arc mode (e.g., when a gas flow is used to bias the electrode 104 into contact with the end cap 106 ), such as within a blow-back distance of 0.02 to 0.12 inches. The locking of the swirl ring 102 to the end cap 106 at the interface 120 via the retention element 230 also secures the resilient element 122 within the cartridge 100 while accurately positioning the resilient element 122 relative to the proximal end 124 of the electrode 104. In addition, the joining of the nozzle 108 to the swirl ring 102 helps to define the longitudinal motion of the electrode 104 to within the blow-back distance between the distal end 125 of the electrode 104 and the nozzle exit orifice 144 during the transferred arc operation. Such restraint on the longitudinal motion of the electrode 104 promotes accuracy and repeatability of plasma arc initiation in torch operations. Similarly, each of the retention surfaces/elements 716, 730 of FIGS. 5a and b simplifies alignment of the parts in the cartridge 100 upon assembly of the swirl ring 702 into the cartridge 100.

Figure 6:
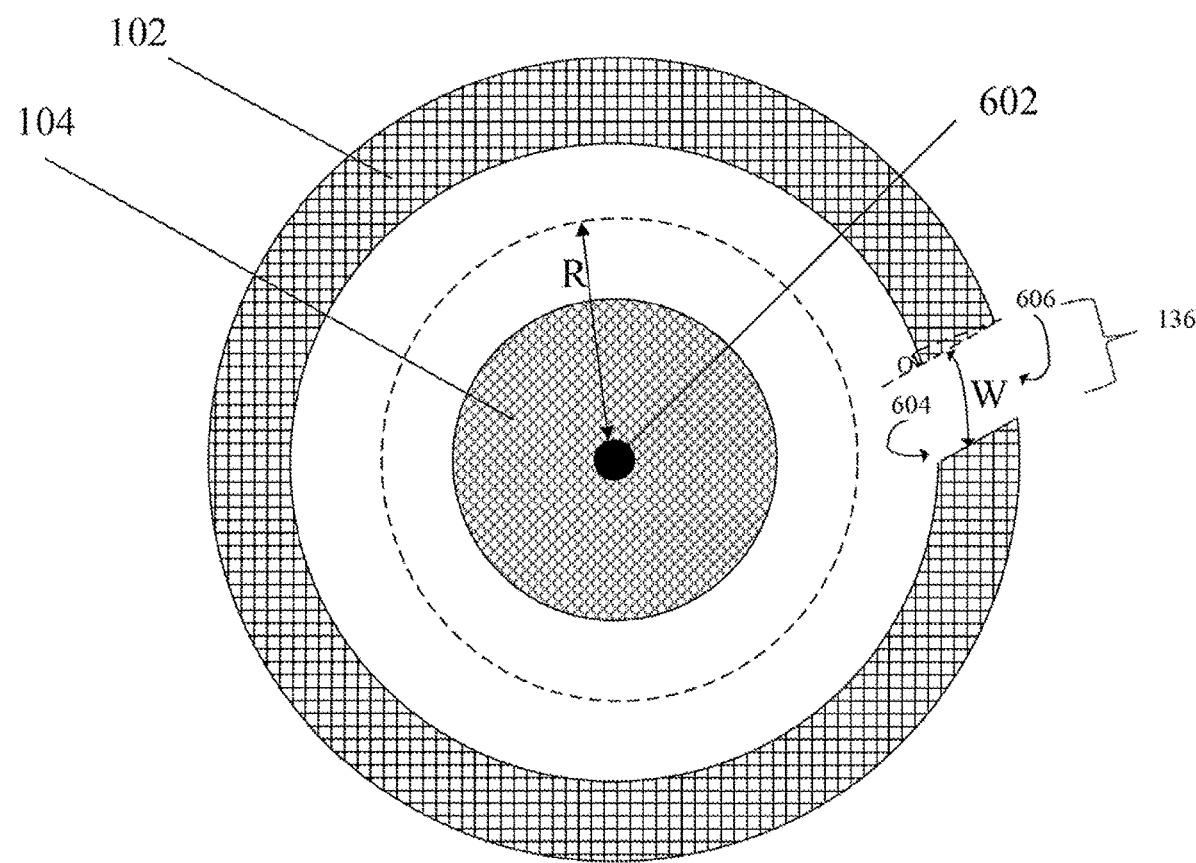
FIG. 6 is a sectional view of the swirl ring of the cartridge of FIG. 1 with the electrode aligned within the swirl ring and illustrating an exemplary gas flow opening.

In some embodiments, the gas flow openings 136 of the swirl ring 102 are suitably shaped and dimensioned to enhance swirling of a gas flow therethrough. FIG. 6 is a sectional view of the swirl ring 102 of the cartridge 100 of FIG. 1 with the electrode 104 radially aligned within the swirl ring 102 and illustrating an exemplary gas flow opening 136.

As shown, the swirl ring 102 and the electrode 104 have a shared center 602. Width W represents the curved axial width of each gas flow opening 136 (only one gas flow opening is shown). Length R represents the average distance (radius) between the center of the electrode 104 and the radius of the annular space between the exterior of the electrode body and the inner wall of the swirl ring 102, as measured from the shared center 602. In some embodiments, the W/R ratio is less than about 0.5. This value allows a gas flow entering a gas flow opening 136 to impinge somewhat perpendicularly on surface of the electrode 104, increasing gas turbulence and enhancing electrode cooling. In contrast, a traditional gas flow opening design has a W/R ratio of about 1.0, which causes a gas to impinge at most tangentially relative to a surface of the electrode 104. The substantial perpendicular impingement (as opposed to the tangential impingement) generates more flow distribution, more uniform gas flow swirling, and better cooling of the electrode 104. In some embodiments, the life of the electrode 104 is extended by 25% when the W/R ratio is less than about 0.5. This design ratio is applicable to gas flow openings 136 represented by slots 202 molded at the distal end 110 of the swirl ring 102 or by enclosed holes (not shown) formed, molded, or drilled into the distal end 110.

In some embodiments, only one row of gas flow openings 136 is disposed around the distal end 110 of the swirl ring 102. For example, one row of twelve gas flow openings 136 can be disposed symmetrically about the swirl ring 102. In contrast, traditional swirl ring designs have two or more rows (layers) of gas flow openings, with some traditional swirl rings having eighteen openings per row. Due to the reduced number of gas flow openings 136 in the present design, the width W of individual gas flow openings 136 is increased to generate the same gas flow swirl force and maintain the same overall cross-sectional area of the gas flow openings 136 combined in comparison to the traditional designs. In addition, for each gas flow opening 136, the offset O between the opening 604 in the inner wall of the swirl ring 102 and the opening 606 on the outer wall of the swirl ring 102 is reduced (e.g., to about less than or equal to about 0.040 inches) whereas such an offset associated with a gas flow opening of a traditional swirl ring design is larger (e.g., about 0.12 inches) In general, reducing the number of gas flow openings 136, coupled with locating the openings 136 on a single row, simplifies manufacturing cycle time, reduces material cost, and is more compatible with an injection molding approach for manufacturing the swirl ring 102. The gas flow opening design described with respect to the swirl ring 102 can also be applied to the swirl ring 702 of FIGS. 5a and b.

In some embodiments, the swirl ring 102 or 702 is manufactured through injection molding of one or more high-temperature thermoplastic materials comprising a polymer formed of ether and ketone molecules (e.g., ether ketone based compounds), such as polyetheretherketone (PEEK), polyaryletherketone (PAKE), polyetherketoneketone (PEKK), polyetherketoneetherketone-ketone (PEKEKK) and variants thereof. Exemplary thermoplastic materials also include polyamide-imide (PAI), polyetherimide (PEI), and/or polytetrafluoroethylene (PTFE). In some embodiments, properties associated with suitable thermoplastic materials for the invention have a glass transition temperature (Tg) of greater than about 320 Fahrenheit, a coefficient of linear thermal expansion (CLTE) of less than about 22 micro-inch/inch-Fahrenheit below Tg, a CLTE of less than about 55 micro-inch/inch-Fahrenheit above Tg, a melting point of greater than about 720 Fahrenheit, and/or a dielectric strength of greater than about 480 kilo-volt/inch. The use of thermoplastics to manufacture swirl rings reduces cartridge cost in comparison to, for example, Vespel™, Torlon, Celazole or Phenolic compounds or other thermal-set plastics, which are materials currently used to manufacture swirl rings, but are comparatively more expensive to obtain and difficult to use. However, it is known that thermoplastics have operating temperatures that are lower than thermos-set Vespel™, which can potentially impact the integrity of swirl rings and electrode life in general. To resolve the high temperature performance issues, the swirl ring 102 or 702 can be made from thermoplastic resins having one or more fortifying additives to provide the desired thermal resistance and/or thermal conductivity, thus enabling effective use of thermoplastic material(s) in cartridges and/or swirl rings. Exemplary fortifying additives include glass fibers, minerals, boron nitride (BN), Cubic BN and/or Vespel™ particles. As an example, the material polymide/polyetheretherketone (PI/PEEK), a heat resistant material that can include about 50% recycled Vespel™ particles, can be used to manufacture the swirl ring 102 or 702. In addition, the swirl ring 102 or 702 is positioned in such a location in the cartridge 100 that it avoids exposure to the highest operating temperatures during torch operation. Thus, in practice, using a thermoplastic material to manufacture the swirl ring 102 is unlikely to affect the integrity of the swirl ring 102 or 702. Furthermore, when the electrode 104 experiences an end-of-life event, which is also the end of life of the cartridge 100, the plastic material melts, which does not affect the cutting operation during the consumable life. In contrast, known thermal-set based swirl rings, which are reused repeatedly with various sets of electrodes and nozzles, commonly have lifecycles of 20 to 30 times that of electrodes and nozzles. These lifecycles place requirements and demands on the swirl rings, which can lead to over design and also inconsistent performance as the swirl rings can thermally warp (e.g., expand and/or shrink) over their lifecycles, providing different fits, interfaces, and performance based on lifecycle position.

In some embodiments, the elongated body 103 of the swirl ring 102 is formed using an injection molding technique (e.g., thermoplastic injection molding). In some embodiments, if the gas flow openings 136 include slots 202 defined by the distal end 110 of the swirl ring 102, the slots 202 can be formed at the same time as the elongated body 103 via the same thermoplastic injection molding process. In general, the gas flow slots 202, in contrast to drilled holes in accordance with traditional designs for creating gas flow passageways, are more compatible with the injection molding technique for forming the swirl ring 102. Thus, molding the gas flow slots 202 into the swirl ring body 103 eliminates the additional step of drilling holes into the body 103. Using gas flow slots 202 instead of drilled holes in a swirl ring design also reduces material cost and the cost of long cycle time associated with drilling operations. The nozzle retention feature 216 and/or the cap retention feature 230 can also be formed at the same time as the elongated body 103 via the same thermoplastic injection molding process. Therefore, most, if not all, of the swirl ring 102 can be manufactured using a cost-effective single injection molding process. Overall, a molded thermoplastic process for forming the swirl ring 102 provides a faster and cheaper manufacturing approach in comparison to the traditional processes. Processes and materials for manufacturing the swirl ring 102 of FIGS. 4a and b can also be used to manufacture the swirl ring 702 of FIGS. 5a and b.

Figure 7A:
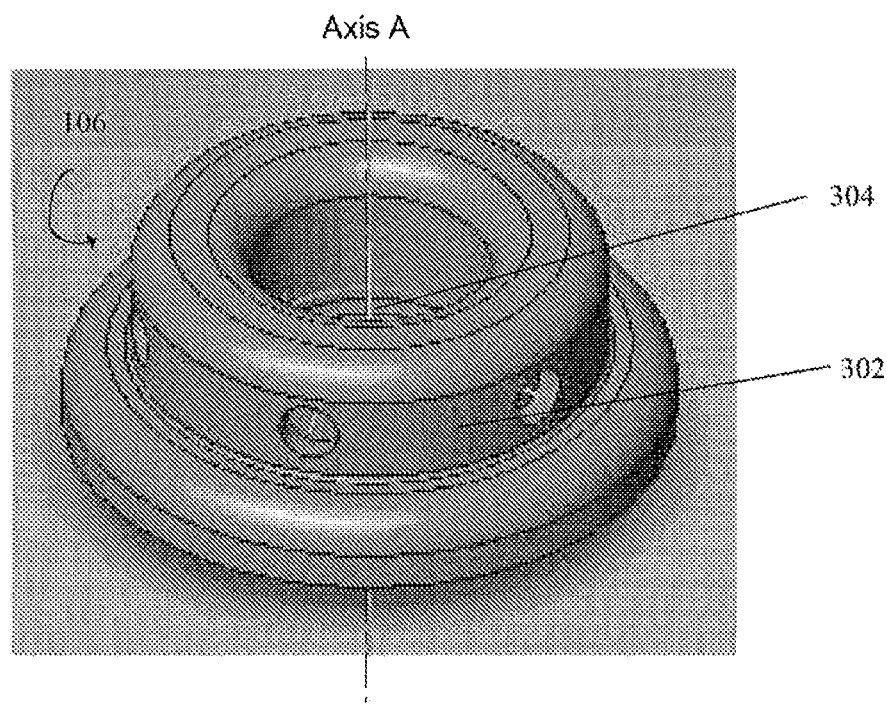
FIGS. 7a and 7b are isometric and sectional views of the end cap of the cartridge of FIG. 1, respectively, according to an illustrative embodiment of the invention.
Figure 7B:
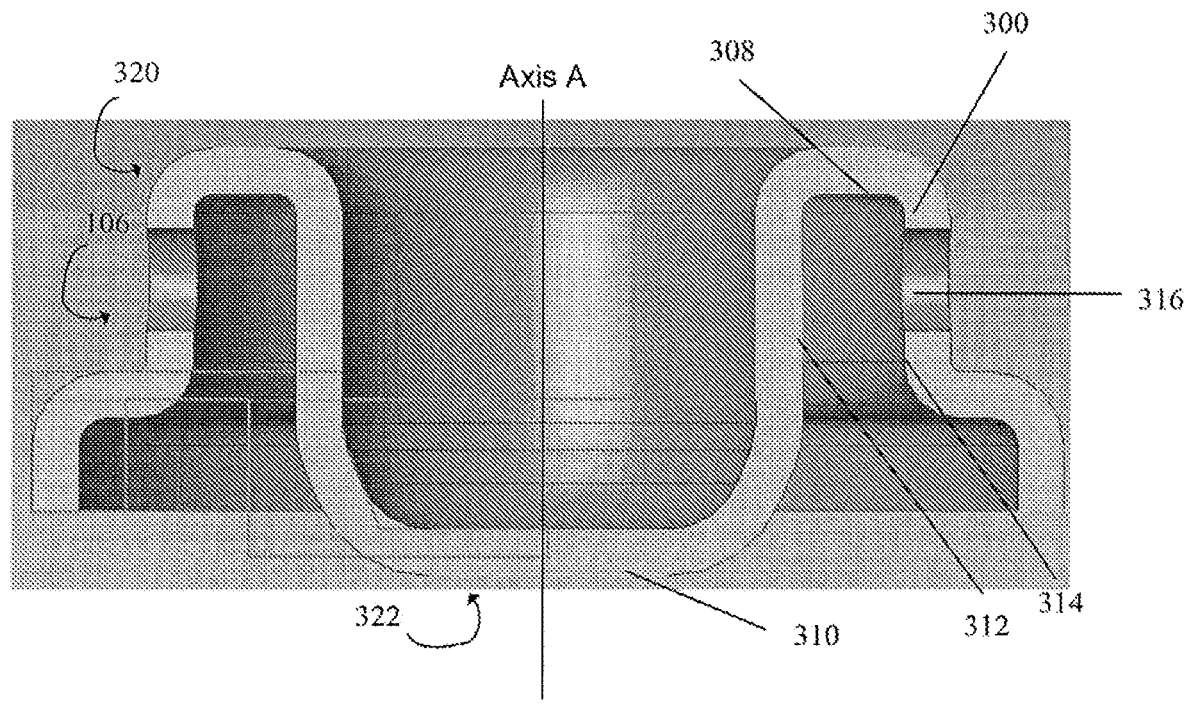

FIGS. 7a and b are isometric and sectional views of the end cap 106 of the cartridge 100 of FIG. 1, respectively, according to an illustrative embodiment of the invention. The end cap 106 provides at least one of the following functions: (i) securely engaging the swirl ring 102 or 702 at its proximal end 112 to form the interface 120, thereby aligning the electrode 104; (ii) providing a holder for the resilient element 122; and (iii) passing an electrical current to the electrode 104 in a blow-back contact-start configuration. As illustrated, the end cap 106 has a substantially hollow body 300 defining a proximal end 320 and a distal end 322. The hollow body 300 includes a circular tunnel portion 302 and a depressed center 304 extending away from the proximal end 320 of the end cap 106. In some embodiments, the body 300 of the end cap 306 has a substantially uniform thickness, thereby promoting efficient and uniform current passage and assisting with the establishment of precise consumables alignment. Uniform thickness of the end cap 106, coupled with a stamp manufacturing technique, also simplifies manufacturing and minimizes manufacturing cycle time, consumable weight, and material usage.

In some embodiments, an interior surface 308 of the circular tunnel portion 302 at the proximal end 320 defines a biasing surface for physically contacting and electrically communicating with the resilient element 122. The resilient element 122 can bias against the proximal end 124 of the electrode 104 so as to move the electrode 104 away from the end cap 106. That is, the resilient element 122 is situated between and physically contacts the biasing surface 308 of the end cap 106 and the proximal end 124 of the electrode 104 such that the resilient element 122 imparts a separation force between the electrode 104 and the biasing surface 308.

In some embodiments, an interior surface 310 of the depressed center 304 of the end cap 106 at the distal end 322 defines a contact surface that is configured for physical contact and electrical communication with a corresponding contact surface 128 of the electrode 104 at its proximal end 124. During the transferred arc mode, the contact surface 310 of the end cap 106 is in an abutting relationship with the corresponding contact surface 128 of the electrode 104. However, during the initiation of a pilot arc in the pilot arc mode, the contact surface 310 is in a spaced relationship with the corresponding contact surface 128 that is defined by an absence of contact between the two surfaces.

The resilient element 122 is generally maintained inside of the cartridge 100 between the end cap 106 and the electrode 104. In some embodiments, the resilient element 122 is secured to either the end cap 106 or the electrode 104. In other embodiments, the resilient element 122 is secured to both the electrode 104 and the end cap 106. For example, the resilient element 122 can be secured by welding, soldering, bonding, fastening, a diametral interference fit or another type of friction fit to the end cap 106 and/or the electrode 104. In some embodiments, the substantially hollow body 300 of the end cap 106 is configured to house the resilient element 122 between its biasing surface 308 and the proximal end 124 of the electrode 104. For example, the circular tunnel portion 302 of the end cap 106 can function as a holder of the resilient element 122. Specifically, the resilient element 122 can be held in place by the biasing surface 308, an inner interior surface 312 and an outer interior surface 314 of the tunnel portion 302, where the diameter of the inner interior surface 312 with respect to the longitudinal Axis A is slightly smaller than the inner diameter of the resilient element 122, and the diameter of the outer interior surface 314 with respect to the longitudinal Axis A is slightly larger than the outer diameter of the resilient element 122.

In some embodiments, radial movement of the resilient element 122 is further restrained by the proximal end 112 of the swirl ring 102 or 702 after the swirl ring 102 or 702 is affixed to the end cap 106. As shown in FIG. 1, after the end cap 106 is coupled to the swirl ring 102 (e.g., by being crimped into the cap engagement groove 230), the lip portion 232 of the swirl ring 102 can extend into the interior of the circular tunnel portion 302 of the end cap 106. Therefore, the lip portion 232 can further restrain and guide the positioning of the resilient element 122 inside of the end cap 106.

In some embodiments, the end cap 106 is configured to be in electrical communication with a power supply (not shown) when the cartridge 100 is installed within a torch. This enables a flow of current from the power supply to the electrode 104 via the resilient element 122 and/or the contact surface 310, depending on the mode of torch operation. In some embodiments, at least one vent hole 316 (or gas exit orifice) is disposed in the end cap 106, extending from an interior surface to an exterior surface of the body 300 to cool the cartridge 100. For example, a vent hole 316 can be located on the circular portion 302. Alternatively, vent hole(s) 316 are absent from the end cap 106.

In one exemplary operation, during pilot arc initiation, the power supply provides a pilot arc current to the end cap 106 and the pilot arc current is passed to the electrode 104 through the resilient element 122 that biases the electrode 104 against nozzle 108. As the resilient element 122 urges the electrode 104 into abutting relation with the nozzle 108, there is an absence of physical contact and electrical communication between the contact surface 310 of the end cap 106 and the corresponding contact surface 128 of the electrode 104. The resilient element 122 can be configured to pass substantially all of the pilot arc current from the end cap 106 to the electrode 104.

During pilot arc initiation, a gas is introduced into the plasma chamber 140 between the electrode 104 and the nozzle 108. Gas pressure can build within the plasma chamber 140 until the pressure is sufficient to overcome the separation force exerted by the resilient element 122. At that point, the gas pressure moves the electrode 104 toward the end cap 106 and away from the nozzle 108 along the longitudinally axis A (while compressing the resilient element 122) until the corresponding contact surface 128 of the electrode 104 comes into physical contact with the contact surface 310 of the end cap 106. As the electrode 104 is moved away from the nozzle 108 by gas pressure, an arc is generated or initiated in the plasma chamber 140 to form a plasma arc or jet that can be transferred to a workpiece (not shown).

During transferred arc mode, the corresponding contact surface 128 of the electrode 104 engages in substantially planar physical contact with the contact surface 310 of the end cap 106 to establish electrical communication (e.g., electrical current passes between the end cap 106 and the electrode 104 at the interface of the contact surface 310 and the corresponding surface 128). When the contact surface 310 of the end cap 106 abuts the corresponding surface 128 of the electrode 104, a current path is established such that at least a portion of a current passes directly between the two components. When the arc has been transferred to the workpiece, a cutting current is supplied to the torch (e.g., during transferred arc mode). The cutting current can be passed from the end cap 106 to the electrode 104 during transferred arc operation via (1) the resilient element 122 and/or (2) the interface between the contact surfaces 310, 128. In some embodiments, the current path directly between the end cap 106 and the electrode 104 has lower resistance and/or higher conductance than the current path from the end cap 106 through the resilient element 122 to the electrode 104. Hence, substantially all of the electrical current for sustaining a plasma arc (in transferred arc mode) can be passed directly between the contact surfaces 128, 310.

In some embodiments, the resilient element 122 is formed from a material that facilitates both carrying an electrical current and dissipating thermal heat associated with the current to prevent the resilient element 122 from melting. For example, the material of the resilient element 122 can be selected based on the current rating of the material. In some embodiments, the resilient element 122 comprises a helical compression spring, wire, or metal strip. For example, different types of resilient element 122 configurations are described in U.S. Ser. No. 13/344,860, assigned to Hypertherm, Inc., of Hanover, N.H., the contents of which are hereby incorporated herein by reference in their entirety.

In some embodiments, the end cap 106 is fabricated from an electrically conductive material, such as copper, copper alloy, brass, or other materials suitable for passing current both during pilot arc operation and transferred arc operation. The end cap 106 can be formed using a stamping approach from a material blank.

Figure 8:
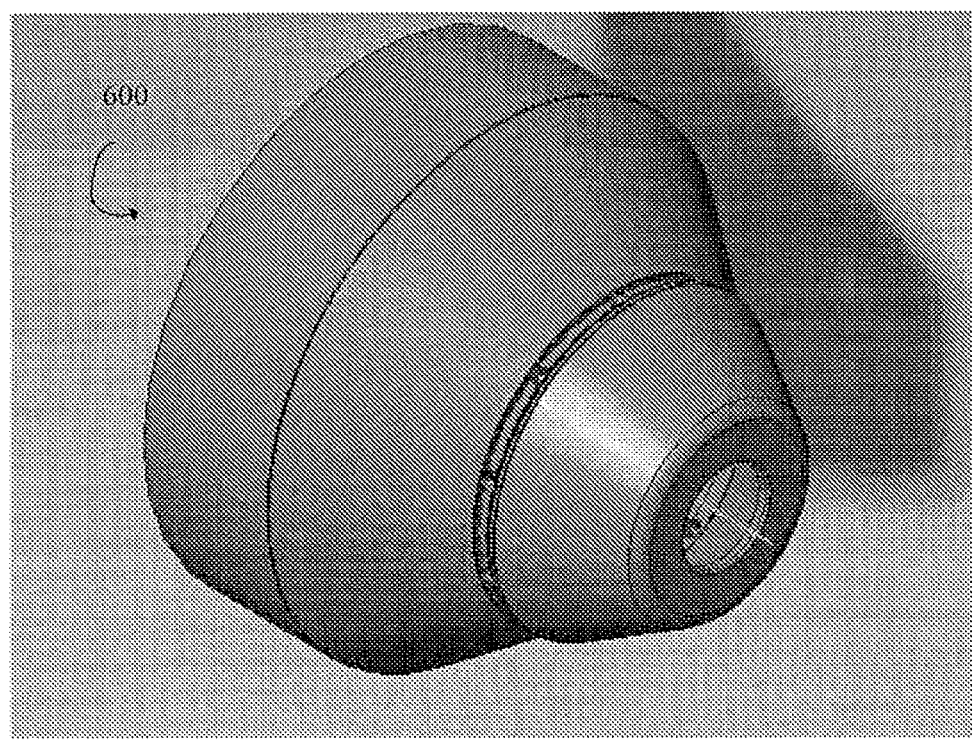
FIG. 8 is an exemplary shield design compatible with the cartridge of FIG. 1, according to an illustrative embodiment of the invention.

In another aspect, the cartridge 100 can additional include a shield. FIG. 8 shows an exemplary shield 600 compatible with the cartridge 100 of FIG. 1, according to an illustrative embodiment of the invention. The shield 600 can be made from a conductive material, such as copper or silver. The shield 600 can be affixed to the nozzle 108 via one of crimping, threading and snap-fit. In some embodiments, a flow passageway (not shown) is disposed in the nozzle 108 to allow a gas (e.g., a shield gas) to flow through/by the nozzle 108 to the shield 600.

Figure 9:
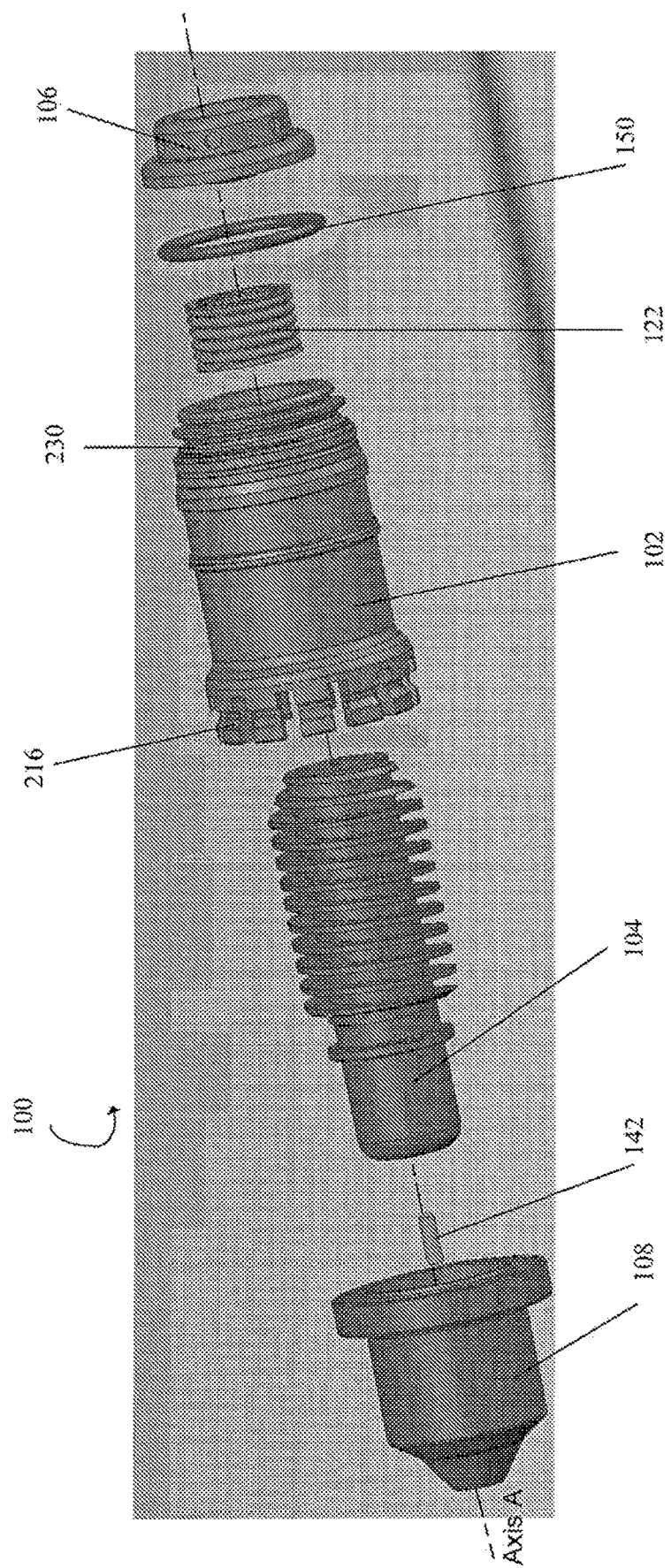
FIG. 9 is an exploded view of the cartridge of FIG. 1, according to an illustrative embodiment of the invention.

FIG. 9 is an exploded view of the cartridge 100 of FIG. 1, according to an illustrative embodiment of the invention. FIG. 9 shows the nozzle 108, the electrode 104, the swirl ring 102, the resilient element 122, the sealing device 150, and the end cap 106 in an unassembled state before forming the cartridge 100. In some embodiments, the insert 142 is also a part of the cartridge 100. During assembly, the electrode 104 is housed in the chamber formed by the coupling of the nozzle 108 to the distal end 110 of the swirl ring 102. The nozzle 108 can be securely affixed to the outer wall of the swirl ring 102 through the retention element 216 (e.g., a groove disposed on the swirl ring 102 against which the nozzle 108 is crimped or a thread to which the nozzle 108 is threaded). This interconnection secures the electrode 104 within the cartridge 100 while the inner wall of the swirl ring axially aligns the electrode 104 about the longitudinal axis A with respect to the nozzle 108 such that the electrode 104 is limited in its axial motion. The resilient element 122 is inserted into the swirl ring 102 from its proximal end 112 until it contacts the proximal end 124 of the electrode 104 within the swirl ring 102. The end cap 106 is then securely affixed to the proximal end 112 of the swirl ring 102 while substantially confining the resilient element 122 in the circular portion 304 of the end cap 106 and axially aligning the resilient element relative to the end cap 106. The end cap 106 can be connected to the swirl ring 102 through the retention element 230 (e.g., a groove disposed on the swirl ring 102 against which the end cap 106 is crimped or a thread to which the end cap 106 is threaded). This interconnection enables the biasing surface 308 of the end cap 106 to bias the resilient element 122 against the proximal end of the electrode 104, thereby urging it into an abutting position with the nozzle 108. This interconnection also longitudinally aligns the electrode 104 with respect to the end cap 106 such that during the transferred arc mode, the electrode 104 is only able to retract from the nozzle 108 far enough until it abuts the contact surface 310 of the depressed portion 304 of the end cap 106. Furthermore, the sealing device 150 can be disposed around an exterior surface of the proximal end 112 of the swirl ring 102 either before or after the end cap 106 is affixed to the swirl ring 102. In some embodiments, the swirl ring 702 of FIGS. 5a and b are used in the cartridge 100 in place of the swirl ring 102.

In some embodiments, a method is provided to assemble the cartridge 100 of FIG. 1. First, a thermoplastic material is molded to form the swirl ring 102 or 702. Various features of the swirl ring 102 or 702 can be created during the same molding process, such as the gas flow openings 136 and/or the nozzle retention surface 216 molded at the distal end 110 of the swirl ring 102. Similar features can be molded onto the swirl ring 702. During assembly, the electrode 104 can be disposed inside of the hollow body of the swirl ring 102 or 702. The inside wall of the swirl ring 102 or 702 can radially align the electrode 104. The electrode can be retained within the swirl ring 102 or 702 by fixedly securing the nozzle 108 to the distal end 110 of the swirl ring 102 or 702 via the nozzle retention surface 216 or 716, respectively. For example, the fixedly securing can be achieved through one of crimping, threading or snap-fitting with respect to the nozzle retention surface 216 or 716. Upon affixing the nozzle 108 to the swirl ring 102 or 702, a radial centering of the nozzle exit orifice 144 with respect to the distal end 125 of the electrode 104 is established. The electrode 104 can be longitudinally aligned relative to the nozzle 108 by fixedly securing an end cap 106 to the proximal end 112 of the swirl ring 102 or 702 via the cap retention element 230 or 730, respectively, thereby establishing the longitudinal alignment during a transferred arc operation of the cartridge 100 when a gas flow is used to bias the electrode 104 into contact with the end cap 106. Specifically, during the transferred arc mode, the longitudinal alignment includes restraining a longitudinal motion of the electrode 104 to within a blowback distance defined by the distal end 125 of the electrode 104 and the exit orifice 144 of the nozzle 108. In some embodiments, the resilient element 122 is inserted into the end cap 106 and housed in the tunnel portion 302 of the end cap 106 prior to affixing the end cap to the swirl ring 102 or 702. In some embodiments, the sealing device 150, such as in the form of an o-ring, can be located on an external surface of the swirl ring 102 or 702 at its proximal end 112 to engage an internal surface of the plasma arc torch body (not shown) when the cartridge 100 is installed into the plasma arc torch body.

Test results have shown that the cartridge design 100 of FIG. 1, operating at a current of 105 amps, can have the same or better performance than that of individual consumables (e.g., a nozzle, electrode, and swirl ring) assembled into a PMX 105 Amp plasma arc torch (operated at 105 amps), and at a lower manufacturing cost. Table 1 shows a comparison of performance and cost between the cartridge 100 and the individual consumables for a PMX 105 Amp plasma arc torch.

|  | Cartridge 100 | PMX 105 Amp Torch |
|---|---|---|
| Anode life at 105A (hours) | 2.5 | 2.2 |
| Max cut speed at ½" mild steel (in per minute) | 95 | 95 |

The cost of the cartridge 100, which represents the combined cost of a swirl ring, electrode and nozzle (i.e., without an end cap), is lower than the total cost of the individual consumables in a PMX 105 Amp torch, which includes the cost of just a nozzle and an electrode (i.e., when a swirl ring is not even considered). In term of performance, a torch having the cartridge 100 installed therein has comparable maximum cut speed as compared to a PMX 105 Amp torch that contains individual consumable components. Performance of a torch containing the cartridge 100 is also better in terms of anode life.

In addition to the benefits described above, there are many others benefits associated with using the cartridge 100 in a plasma arc torch. First, such a design promotes ease of use through quick change capabilities, short setup time and ease of consumable selection for an end user. It also provides consistent cut performance because a suite of consumables are changed at once when the cartridge is changed, where the cartridge promotes easy component alignment, thus accuracy and repeatability of torch operation. In contrast, variation in performance is introduced when components are changed individually at different times. For example, there is more room to make an error when an operator has to align and orient individual torch components relative to each other. In another example, long term re-use of the same component (e.g., a swirl ring) can cause dimensional alteration after each blow-out, thereby altering the performance quality even if all other components are changed regularly. In addition, since the manufacturing and/or installation cost of a cartridge is lower than the combined cost of a set of consumables, there is a lower cost associated with per cartridge change than per change of a set of consumables. Furthermore, different cartridges can be designed to optimize torch operation with respect to different applications, such as marking, cutting, maintaining long life, etc.

In some embodiments, the cartridge 100 is single use, meaning that disassembly and replacement of individual components at the end of the life of the cartridge is not practical or cost effective. The entire cartridge 100 is discarded and/or disposed (e.g., recycled), without replacing individual particular parts. If the cartridge 100 is recycled, in addition to recovering the copper, a benefit of constructing the swirl ring 102 of a thermoplastic material is that the material can be reheated, reshaped, and frozen repeatedly, thus making it easily recyclable. In contrast, Vespel™ and other thermal-set materials lack these characteristics that promote recyclability.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A swirl ring for an air-cooled plasma arc torch, the swirl ring comprising:
    an elongated body comprising a substantially hollow portion, the elongated body having a distal end and a proximal end and configured to receive an electrode within the hollow portion;
    a plurality of gas flow openings each extending from an interior surface to an exterior surface of the elongated body, the gas flow openings disposed about the distal end of the elongated body and configured to impart a swirl to a plasma gas flow of the plasma arc torch, wherein the plurality of gas flow openings include gas flow slots defined by a plurality of extensions located at spaced intervals around a circumference of the distal end of the elongated body of the swirl ring, each gas flow slot situated between a pair of the extensions and extends from the interior surface to the exterior surface of the elongated body to impart the swirl to the plasma gas flowing between the interior and exterior surfaces; and
    a nozzle retention surface on the body for retaining a nozzle at the distal end of the elongated body.

2. The swirl ring of claim 1, wherein the nozzle retention surface includes a nozzle retention feature located on an external surface of the extensions.

3. The swirl ring of claim 2, wherein the nozzle retention feature comprises a groove configured to receive a portion of the nozzle via crimping.

4. The swirl ring of claim 1, wherein the nozzle retention surface comprises a sloped surface configured to receive a portion of the nozzle via crimping.

5. The swirl ring of claim 1, wherein the distal end of the elongated body of the swirl ring and the nozzle cooperatively define the plurality of gas flow openings.

6. The swirl ring of claim 1, wherein the swirl ring is configured to engage the nozzle via one of snap fit or threading.

7. The swirl ring of claim 1, wherein the swirl ring is configured to engage the nozzle via crimping.

8. The swirl ring of claim 1, wherein the elongated body is formed in an injection molding process.

9. The swirl ring of claim 8, wherein at least one of the nozzle retention feature or the plurality of gas flow openings are molded onto the elongated body in the same injection molding process.

10. The swirl ring of claim 1, wherein the elongated body is formed from a thermoplastic material.

11. The swirl ring of claim 10, wherein the thermoplastic material comprises a polymer formed of ether and ketone molecules.

12. The swirl ring of claim 11, wherein the thermoplastic material further comprises one or more additives.

13. The swirl ring of claim 11, wherein the thermoplastic material has one or more properties comprising (i) a glass transition temperature (Tg) of greater than about 320 Fahrenheit (F), (ii) a coefficient of linear thermal expansion (CLTE) of less than about 22 micro-inch/inch-Fahrenheit (micro.in/in.F) below Tg, (iii) a CLTE of less than about 55 micro.in/in.F above Tg, (iv) a melting point of greater than about 720 Fahrenheit, and (v) a dielectric strength of greater than about 480 kilo-volt/inch.

14. The swirl ring of claim 1, further comprises a cap retention element located on the elongated body for retaining a cap at the proximal end of the elongated body, the cap substantially encloses the proximal end.

15. The swirl ring of claim 14, wherein the cap retention element comprises a groove configured to secure the cap by at least one of crimping, threading, or snap fit.

16. The swirl ring of claim 14, wherein the elongated body of the swirl ring, in cooperation with the cap, is adapted to longitudinally align the electrode to retrain a longitudinal motion of the electrode.

17. The swirl ring of claim 1, wherein a ratio of an axial width (W) of each gas flow opening to an average radius (R) between a radius of the electrode and a radius of an inner wall of the swirl ring is less than about 0.5.

18. The swirl ring of claim 1, wherein the plurality of gas flow openings are disposed in a single layer about the distal end of the elongated body.

19. The swirl ring of claim 18, wherein each gas flow opening has an offset of 0.040 inches between an opening in an inner wall of the swirl ring and an opening on an outer wall of the swirl ring.

20. The swirl ring of claim 1, wherein the elongated body of the swirl ring, in cooperation with the nozzle, is adapted to radially align the electrode to limit a radial motion of the electrode.

21. A method for assembling a plurality of components in a cartridge that includes the swirl ring of claim 1, the method comprising:
molding a thermoplastic material to form the swirl ring;
disposing an electrode inside of the hollow body of the swirl ring;
retaining a nozzle at the distal end of the swirl ring to capture the electrode within the cartridge; and
securing an end cap to the proximal end of the swirl ring to longitudinally align the electrode relative to the nozzle, thereby establishing the longitudinal alignment during a transferred arc operation of the cartridge when a gas flow is used to bias the electrode into contact with the end cap.

22. The method claim 21, further comprising radially aligning the electrode by restraining a radial motion of the electrode within the hollow body of the swirl ring.

23. The method of claim 21, wherein the longitudinal alignment comprises restraining a longitudinal motion of the electrode to within a blow-back distance defined by a distal end of the electrode and an exit orifice of the nozzle during the transferred arc operation.

24. The method claim 21, wherein retaining the nozzle to the distal end of the swirl ring comprises crimping a portion of the nozzle into the nozzle retention surface on the distal end of the swirl ring.

25. The method of claim 21, wherein molding a thermoplastic material to form the swirl ring comprises:
forming the hollow body from the thermoplastic material; and
forming the plurality of gas flow openings.

26. The method of claim 25, further comprising forming the nozzle retention surface on the hollow body using the thermoplastic material.

27. The method of claim 26, further comprising forming the hollow body, the plurality of gas flow openings, and the nozzle retention surface of the swirl ring from a single injection molding process.

28. The method of claim 25, wherein forming the plurality of gas flow openings comprises forming the slots defined by the plurality of extensions disposed about the distal end.

29. The method of claim 21, wherein the thermoplastic material comprises a polymer formed of ether and ketone molecules.

30. The method of claim 29, wherein the thermoplastic material comprises a polymer formed of ether and ketone molecules.

31. The method of claim 21, wherein the end cap is formed from an electrically conductive material.

32. The method of claim 21, further comprising positioning a resilient element between the end cap and the electrode.

33. The method of claim 32, wherein the resilient element is configured to pass substantially all of a pilot arc current from a power supply to the electrode.

34. A method for retaining a nozzle to the swirl ring of claim 1 in a plasma arc torch, the method comprising:
providing the swirl ring of claim 1;
providing a nozzle with a proximal end and a distal end;
attaching the proximal end of the nozzle to the nozzle retention surface of the swirl ring to secure and align the nozzle relative to the swirl ring; and
forming the plurality of gas flow openings by closing the gas flow slots of the swirl ring by the proximal end of the nozzle upon attaching the nozzle to the swirl ring, wherein the gas flow openings are configured to impart a swirl to a plasma gas flow of the plasma arc torch.

35. The method of claim 24, wherein the nozzle retention surface comprises one or more grooves located on an external surface of the elongated body.

36. The method of claim 35, wherein the one or more grooves are located on the plurality of extensions.

37. The method of claim 34, wherein the nozzle retention surface is configured to attach the nozzle through one of snap fit, crimping or threading.

38. The method of claim 37, further comprising retaining an electrode inside of a chamber formed upon attaching the nozzle to the swirl ring, the nozzle adapted to restrain a longitudinal movement of the electrode.

39. The method of claim 34, further comprising radially centering a nozzle exit orifice of the nozzle with respect to the electrode upon attaching the nozzle to the swirl ring.

* * * * *